United States Patent
Tzirkel-Hancock et al.

(10) Patent No.: US 9,934,780 B2
(45) Date of Patent: *Apr. 3, 2018

(54) METHOD AND SYSTEM FOR USING SOUND RELATED VEHICLE INFORMATION TO ENHANCE SPOKEN DIALOGUE BY MODIFYING DIALOGUE'S PROMPT PITCH

(75) Inventors: Eli Tzirkel-Hancock, Ra'Anana (IL); Omer Tsimhoni, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 1006 days.

This patent is subject to a terminal disclaimer.

(21) Appl. No.: 13/351,315

(22) Filed: Jan. 17, 2012

(65) Prior Publication Data

US 2013/0185078 A1 Jul. 18, 2013

(51) Int. Cl.

| | |
|---|---|
| *G10L 21/00* | (2013.01) |
| *G10L 15/00* | (2013.01) |
| *G10L 15/22* | (2006.01) |
| *G10L 15/20* | (2006.01) |
| *G10L 21/0208* | (2013.01) |
| *G10L 21/0216* | (2013.01) |

(52) U.S. Cl.
CPC .............. *G10L 15/22* (2013.01); *G10L 21/00* (2013.01); *G10L 15/20* (2013.01); *G10L 21/0208* (2013.01); *G10L 2015/226* (2013.01); *G10L 2021/02165* (2013.01)

(58) Field of Classification Search
CPC .............................. G10L 15/265; G10L 15/20
USPC ................................................. 704/275, 233
See application file for complete search history.

(56) References Cited

U.S. PATENT DOCUMENTS

| | | |
|---|---|---|
| 5,960,397 A | 9/1999 | Rahim |
| 6,324,499 B1 | 11/2001 | Lewis et al. |
| 7,212,965 B2 | 5/2007 | Dupont |
| 7,966,188 B2 * | 6/2011 | Ativanichayaphong et al. ............... 704/275 |
| 8,914,290 B2 | 12/2014 | Hendrickson et al. |
| 2005/0071159 A1 | 3/2005 | Boman |
| 2005/0187763 A1 | 8/2005 | Arun |
| 2008/0263451 A1 * | 10/2008 | Portele et al. ................ 715/727 |
| 2008/0300871 A1 * | 12/2008 | Gilbert ......................... 704/233 |
| 2009/0175459 A1 | 7/2009 | Marumoto et al. |

(Continued)

FOREIGN PATENT DOCUMENTS

| | | |
|---|---|---|
| CN | 1339774 A | 3/2002 |
| JP | 2257200 A | 10/1990 |

(Continued)

OTHER PUBLICATIONS

Office Action for CN1339774A Patent Application No. 201310018029.8 Dated Oct. 10, 2014.

(Continued)

*Primary Examiner* — Farzad Kazeminezhad
(74) *Attorney, Agent, or Firm* — Quinn Law Group, PLLC

(57) ABSTRACT

Sound related vehicle information representing one or more sounds may be received in the processor. The sound related vehicle information may or may not include an audio signal. Spoken dialog of a spoken dialog system associated with the vehicle based on the sound related vehicle information may be modified. The said modification comprises of modifying pitch, pace and timing of audio prompts associated with the said spoken dialog based on the sound related vehicle information.

18 Claims, 7 Drawing Sheets

(56) References Cited

U.S. PATENT DOCUMENTS

| | | |
|---|---|---|
| 2010/0030562 A1* | 2/2010 | Yoshizawa .......... G10L 21/0208 |
| | | 704/270 |
| 2010/0057465 A1 | 3/2010 | Kirsch et al. |
| 2010/0088093 A1 | 4/2010 | Lee |
| 2010/0241431 A1 | 9/2010 | Weng et al. |
| 2011/0090338 A1* | 4/2011 | DeLine ................... B60R 1/12 |
| | | 348/148 |
| 2011/0224979 A1 | 9/2011 | Raux |
| 2012/0123777 A1 | 5/2012 | Agapi et al. |
| 2013/0185065 A1 | 7/2013 | Tzirkel-Hancock et al. |
| 2013/0185066 A1 | 7/2013 | Tzirkel-Hancock et al. |

FOREIGN PATENT DOCUMENTS

| | | |
|---|---|---|
| JP | 2003140691 A | 5/2003 |
| JP | 2004294813 A | 4/2004 |
| JP | 2010102223 A | 5/2010 |

OTHER PUBLICATIONS

Final Office Action for U.S. Appl. No. 13/351,317 Dated Feb. 25, 2015.
Office Action for U.S. Appl. No. 13/351,341 Dated May 19, 2015.
Office Action for U.S. Appl. No. 13/351,317 Dated Sep. 30, 2015.

\* cited by examiner

METHOD AND SYSTEM FOR USING SOUND RELATED VEHICLE INFORMATION TO ENHANCE SPOKEN DIALOGUE BY MODIFYING DIALOGUE'S PROMPT PITCH

FIELD OF THE INVENTION

The present invention is related to enhancing vehicle spoken dialogue using, for example, a combination of sound related vehicle information, signal processing, and other operations or information.

BACKGROUND OF THE INVENTION

Many vehicles are equipped with spoken dialog, voice activated, or voice controlled vehicle systems. Spoken dialog systems may perform functions, provide information, and/or provide responses based on verbal commands. A spoken dialog system may process or convert sounds (e.g., speech produced by a vehicle occupant) from a microphone into an audio signal. Speech recognition may be applied to the audio signal, and the identified speech may be processed by a semantic interpreter. Based on the interpretation of the verbal command, a system such as a dialogue control system may perform an action, generate a response, or perform other functions. A response may, for example, be in the form of a visual signal, audio signal, text to speech signal, action taken by a vehicle system, or other notification to vehicle occupants.

The clarity and decipherability of voice commands may affect the function of a voice activated vehicle system. A microphone may often, however, receive a signal with speech and non-speech related sounds reducing the clarity of voice commands. Non-speech related sounds may include vehicle related noises (e.g., engine noise, cooling system noise, etc.), non-vehicle related noise (e.g., noises from outside the vehicle), audio system sounds (e.g., music, radio related sounds), and other sounds. The non-speech related sounds may often be louder than, overpower, and/or distort speech commands. As a result, a speech recognition system or method may not function properly if non-speech related sounds distort speech commands. Similarly, the accuracy of system such as a dialogue control system in generating responses to speech commands may be reduced by non-speech related sounds. Non-speech related sounds may, for example, distort or overpower text to speech responses, audio, and other signals output from a spoken dialogue system and/or other systems. Thus, a system or method to enhance speech recognition, dialogue control, and/or speech prompting systems based on sound or acoustic related vehicle information is needed.

SUMMARY OF THE INVENTION

Sound related vehicle information representing one or more sounds may be received in the processor. The sound related vehicle information may or may not include an audio signal. Spoken dialogue of a spoken dialogue system associated with the vehicle based on the sound related vehicle information may be modified.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
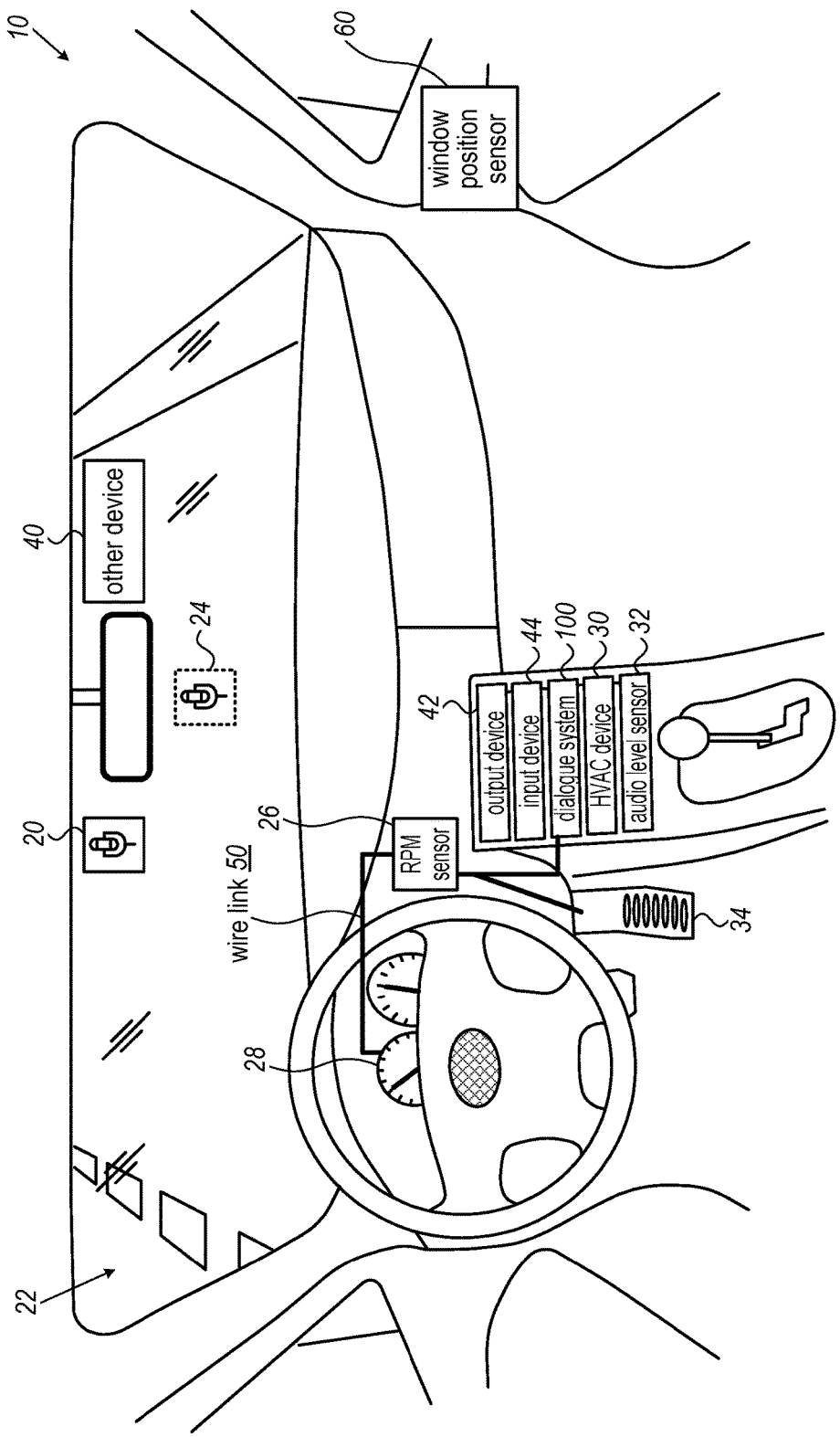
FIG. 1 is a schematic illustration of vehicle with an automatic speech recognition system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may use sound related vehicle information (e.g., information on vehicle systems that relates to sounds in the vehicle, but does not itself include sound signals or recordings or audio signals or recordings), signals or information related to the operation of vehicle systems producing or causing sound, acoustic related vehicle information, or interference sound information (e.g., data indicating window position, engine rotations per minute (RPM), vehicle speed, heating ventilation and cooling (HVAC) system fan setting(s), audio level, or other parameters); external sound measurements; and other information to enhance speech recognition, prompting using, for example, spoken dialogue, dialogue control, and/or other spoken dialogue systems or methods. Prompting may, for example, be information, speech, or other audio signals output to a user from a spoken dialogue system. Sound or acoustic related vehicle information may not in itself include sound signals. For example, sound or acoustic related information may represent (e.g., include information on) an engine RPM, but not a signal representing the sound the engine makes. Sound or acoustic related information may represent (e.g., include information on) the fact that a window is open (or open a certain amount), but not a signal representing the sound the wind makes through the open window. Sound related vehicle information may represent or include vehicle parameters, describing the state of the vehicle or vehicle systems.

Sound related vehicle information or signals or information related to the operation of vehicle systems producing or causing sound may be used to generate an interference profile record (IPR). An interference profile record may, for example, include noise or sound type parameters, noise level or sound intensity parameters, and other information. (In some embodiments, sound related vehicle information may include noise type parameters and/or noise level parameters.) Noise type parameters may, for example, represent or be based on a type of sound related vehicle information (e.g., engine RPM, HVAC fan setting(s), window position, audio playback level, vehicle speed, or other vehicle information) or combinations of types of sound related vehicle information. For example, a noise type parameter may include an indication of whether or not or how much a window is open (but not include a signal representing the sound of wind). Noise level parameters may represent the level of intensity of sound related vehicle information (e.g., HVAC fan setting high, medium, low, or off; audio playback level high, medium, low or off; or other sound related vehicle information) or combinations of sound related vehicle information (e.g., open windows and speed above threshold speed may be represented as noise type parameter of wind and noise level parameter of high). For example, a noise level parameter may include an indication of whether or not or how much a fan is running (but not include a signal representing the sound of the fan). Interference profile records may, in some embodiments, be or may include an integer (e.g., an 8-bit integer or other type of integer), a percentage, a range of values, or other data or information.

In some embodiments, interference profile records (e.g., noise type parameters, noise level parameters and/or other parameters) may be used to enhance speech recognition. The interference profile record may, for example, be used by a speech recognition system or process (e.g., including a signal processor, automatic speech recognition (ASR) system, or other system(s) or method(s)) to modify or alter a sound signal to improve speech recognition system or process decoding. In one example, a signal processor, ASR, or other system may, based on interference profile records (e.g., noise type parameters and noise level parameters), apply a pre-trained filter (e.g., a Weiner filter, comb filter, or other electronic signal filter) to modify or alter the input signal to limit or remove noise and improve speech recognition. For example, based on noise type parameters a type of pre-trained filter may be applied, and based on noise level parameters filter settings or parameters may be determined and/or applied. Filter settings or parameters may, for example, control or represent an amount or level or filtering, frequencies filtered, or other attributes of a filter. A level of filtering (e.g., an amount of filtering), frequencies filtered, and other attributes of filter may, for example, be based on noise level parameters, which may represent a window position (e.g., a percentage of how far window is open), engine revolutions per minute (RPM), vehicle speed, environmental control fan setting, audio playback level, or other vehicle parameters. For example, if a noise level parameter indicates a high level of noise rather than a low level of noise, a higher level or amount of filtering rather than a lower level may be applied to the input signal. Different combinations of filtering levels and noise level parameters may of course be used. Other signal processing methods and/or modules may be used.

In one example, an ASR or other system may, based on interference profile records (e.g., noise type parameters and noise level parameters), apply a pre-trained acoustic model to improve speech recognition. A type of pre-trained acoustic model (e.g., among multiple acoustic models) may be chosen based on interference profile records (e.g., noise type parameters, noise level parameters, and/or other parameters). In some embodiments, a type of acoustic model may correspond to one or more interference profile records. For example, a predetermined acoustic model may be used if predetermined interference profile records are generated based on sound related vehicle information.

According to some embodiments, modification of a speech recognition process based on interference profile records may be adapted. In an adaptation operation supervised learning may be used to adapt or change signal modification parameters (e.g., filter parameters or other parameters), adapt or train acoustic model transformation matrices, adapt or change which pre-trained acoustic model is used, or adapt other features of spoken dialogue system. In an adaptation operation, the effect of signal modification parameters may, for example, be monitored or measured by determining the success or effectiveness of an ASR or other components of a speech recognition system in identifying speech (e.g., words, phrases, and other parts of speech). Based on the measurements, signal modification parameters may, for example, be adapted or changed to improve the function or success of speech recognition and the spoken dialogue system. In one example, a predefined filter (e.g., a Weiner filter, comb filter, or other filter) operating with a given set of filter parameters may be applied based on a given set of noise type parameters and noise level parameters. An adaptation module may, for example, measure how effective or successful a filter operating with a given set of parameters based on noise type parameters and noise level parameters is in enhancing or improving speech recognition. Based on the measurement, the filter parameters may be adapted or changed to improve or enhance speech recognition. Other signal modification parameters may be adapted.

In some embodiments, interference profile records (e.g., noise type parameters, noise level parameters, and/or other parameters) may be used by text to speech, audio processing, or other modules or methods to enhance speech prompting or spoken dialogue, audio output, or other audio signal output, typically to passengers. An audio processing module or other system may, for example, based on noise type parameters, noise level parameters, and/or other parameters increase or decrease a prompt level, shape or reshape the prompt spectrum, modify prompt pitch, or otherwise alter a prompt. An audio processing module may, for example, increase audio output volume level, shape or reshape an audio spectrum (e.g., audio playback spectrum), modify audio playback pitch, and/or otherwise alter audio or sounds. A text to speech module or other system may, for example, modify or alter speech rate, syllable duration, or other speech related parameters based on noise type parameters, noise level parameters, and/or other parameters.

According to some embodiments, modification of speech prompting, audio output, or other audio signal output based on interference profile records may be adapted. In an adaptation operation supervised learning may be used to adapt or change parameters associated with increasing or decreasing a prompt level, parameters used to shape or reshape prompt spectrum, parameters used to modify prompt pitch, and/or other parameters. In an adaptation operation, the effect of parameters used to increase or decrease a prompt level, parameters used to reshape prompt spectrum, parameters used to modify prompt pitch, and/or other parameters may be measured. The substance or content of speech or audio prompts may be altered. Based on the measurement, the parameters used to increase or decrease a prompt level, parameters used to reshape prompt spectrum, parameters used to modify prompt pitch, and/or other parameters may be adapted or changed to improve or enhance prompting or audio output function.

In some embodiments, interference profile records (e.g., noise type parameters, noise level parameters, and/or other parameters) may, for example, be used by a dialogue control module or other system or method to enhance vehicle occupant interaction with the spoken dialogue system. A spoken dialogue control module or other system may, for example, based on noise type parameters, noise level parameters, and/or other parameters modify dialogue control, introduce prompts (e.g., introductory prompts), modify audio prompts, modify the substance or content of output speech, modify dialogue style, listen and respond to user confusion, modify multi-modal dialogue, modify back-end application functionality, and/or perform other operations.

According to some embodiments, modification of spoken dialogue control based on interference profile records may be adapted. In an adaptation operation, supervised learning may be used to adapt or change parameters used in dialogue control, prompt introduction, prompt modification, dialogue style modification, user confusion response, multi-modal dialogue modification, back-end application functionality modification, and/or other operations. In an adaptation operation, the effect of parameters used in dialogue control, prompt introduction, prompt modification, dialogue style modification, user confusion response, multi-modal dialogue modification, back-end application functionality modification, and/or other operations may be measured. Based on the measurement, the parameters used in dialogue control, prompt introduction, prompt modification, dialogue style modification, user confusion response, multi-modal dialogue modification, back-end application functionality modification, and/or other operations may be adapted or changed to improve or enhance spoken dialogue system function.

A spoken dialogue system or method according to embodiments of the present invention may be particularly useful by modifying or altering automatic speech recognition, audio prompting, dialogue control and/or other operations based on accurate timed or real-time vehicle sound related information, a-priori understanding of noise characteristics, and other information. Additionally, parameters used to modify or alter automatic speech recognition, prompting, dialogue control and/or other operations may be adapted or changed to improve the function of the spoken dialogue system throughout the life of the spoken dialogue system. Other and different benefits may realized by embodiments of the present invention.

FIG. 1 is a schematic illustration of vehicle with an automatic speech recognition system according to an embodiment of the present invention. A vehicle 10 (e.g., a car, truck, or another vehicle) may include or be connected to a spoken dialogue system 100. One or more microphone (s) 20 may be associated with system 100, and microphones 20 may receive or record speech, ambient noise, vehicle noise, audio signals and other sounds. Microphones 20 may be located inside vehicle cabin 22, exterior to vehicle cabin 22, or in another location. For example, one microphone 20 may be located inside vehicle cabin 22 and may receive or record speech, non-speech related sounds, noise, and/or sounds inside the cabin 22. Non-speech related sounds may include for example vehicle 10 related noises (e.g., engine noise, heating ventilation and cooling (HVAC) system noise, etc.), non-vehicle related noise (e.g., noises from outside the vehicle), audio system sounds (e.g., music, radio related sounds), and other sounds. One or more exterior microphone (s) 24 may, for example, be located exterior to vehicle cabin 22 (e.g., on vehicle body, bumper, trunk, windshield or another location).

One or more sensors may be attached to or associated with the vehicle 10. A window position sensor 60, engine rotation per minute (RPM) sensor 26, vehicle speed sensor 28 (e.g., speedometer), HVAC sensor 30 (e.g., HVAC fan setting sensor), audio level sensor 32 (e.g., audio system volume level), exterior microphones 24, and other or different sensors such as windshield wiper sensors may measure sound related vehicle information, vehicle parameters, vehicle conditions, noise outside vehicle, or vehicle related information. Sound related vehicle information or interference sound information may be transferred to system 100 via, for example, a wire link 50 (e.g., data bus, a controller area network (CAN) bus, Flexray, Ethernet) or a wireless link. The sound related vehicle information may be used by system 100 or another system to determine an interference profile record (e.g., noise profile record) or other data representing the sound related vehicle information. Other or different sensors or information may be used.

In one embodiment of the present invention, spoken dialogue system 100 may be or may include a computing device mounted on the dashboard or in a control console of the vehicle, in passenger compartment 22, or in the trunk. In alternate embodiments, spoken dialogue system 100 may be located in another part of the vehicle, may be located in multiple parts of the vehicle, or may have all or part of its functionality remotely located (e.g., in a remote server or in a portable computing device such as a cellular telephone). Spoken dialogue system 100 may, for example, perform one or more of outputting spoken dialogue or audio prompts to vehicle occupants and inputting audio information representing speech from vehicle occupants.

According to some embodiments, a speaker, loudspeaker, electro-acoustic transducer, headphones, or other device 40 may output, broadcast, or transmit audio prompts or spoken dialogue responses to voice commands, voice responses, audio commands, audio alerts, requests for information, or other audio signals. Audio prompts and/or responses to voice commands may, for example, be output in response to speech commands, requests, or answers from a vehicle passenger. A prompt may, for example, include information regarding system 100 functionality, vehicle functionality, question(s) requesting information from a user (e.g., a vehicle passenger), information requested by a user, or other information. Prompts and speech input may, in some embodiments, be used in a vehicle in other manners.

A display, screen, or other image or video output device 42 may, in some embodiments, output information, alerts, video, images or other data to occupants in vehicle 10. Information displayed on display 42 may, for example, be displayed in response to requests for information by driver or other occupants in vehicle 10.

Vehicle 10 may, in some embodiments, include input devices or area(s) 44 separate from or associated with microphones 20. Input devices or tactile devices 44 may be, for example, touchscreens, keyboards, pointer devices, turn signals or other devices. Input devices 44 may, for example, be used to enable, disable, or adjust settings of spoken dialogue system 100.

While various sensors and inputs are discussed, in certain embodiments only a subset (e.g. one or another number) of sensor(s) or input may be used.

Figure 2:
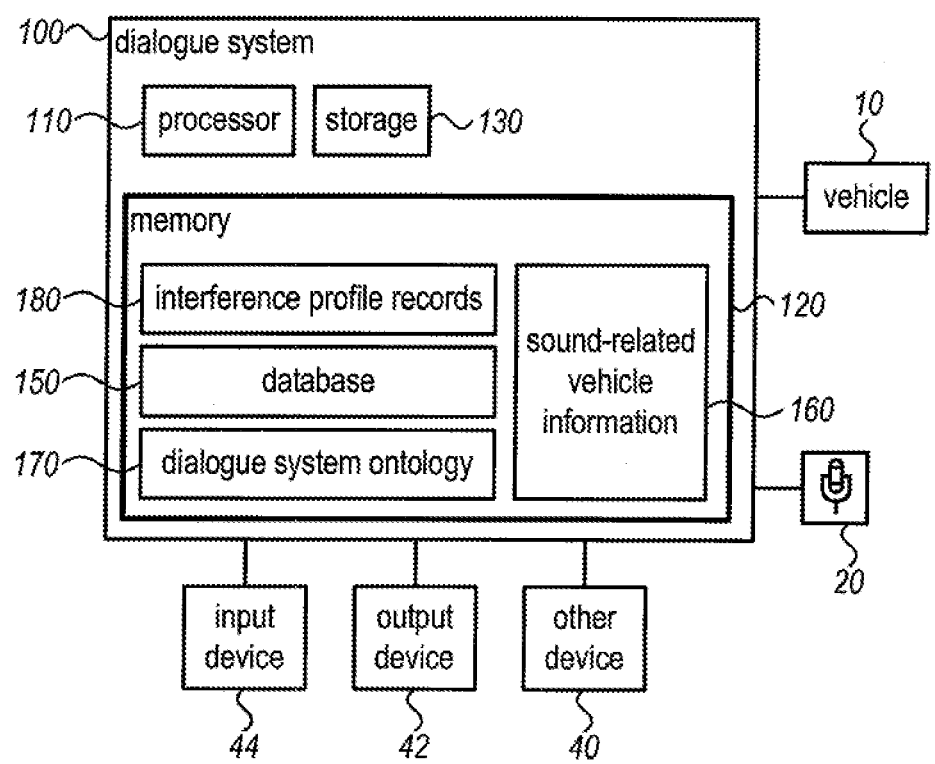
FIG. 2 is a schematic illustration of an automatic speech recognition system according to embodiments of the present invention.

FIG. 2 is a schematic illustration of a spoken dialogue system according to embodiments of the present invention. Spoken dialogue system 100 may include one or more processor(s) or controller(s) 110, memory 120, long term storage 130, input device(s) or area(s) 44, and output device(s) or area(s) 42. Input device(s) or area(s) 44 and output device(s) or area(s) 42 may be combined into, for example, a touch screen display and input which may be part of system 100.

System 100 may include one or more databases 150, which may include, for example, sound or acoustic related vehicle information 160 (e.g., interference sound information), interference profile records (IPRs) 180, spoken dialogue system ontologies 170, and other information. Sound related vehicle information 160 may, for example, include vehicle parameters, recorded sounds, and/or other information. Databases 150 may, for example, include interference profile records 180 (e.g., noise type parameters, noise level parameters, and/or other information), noise profiles, noise profile records, and/or other data representing the vehicle parameters and/or other information. Databases 150 may be stored all or partly in one or both of memory 120, long term storage 130, or another device.

Processor or controller 110 may be, for example, a central processing unit (CPU), a chip or any suitable computing or computational device. Processor or controller 110 may include multiple processors, and may include general-purpose processors and/or dedicated processors such as graphics processing chips. Processor 110 may execute code or instructions, for example, stored in memory 120 or long-term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3:
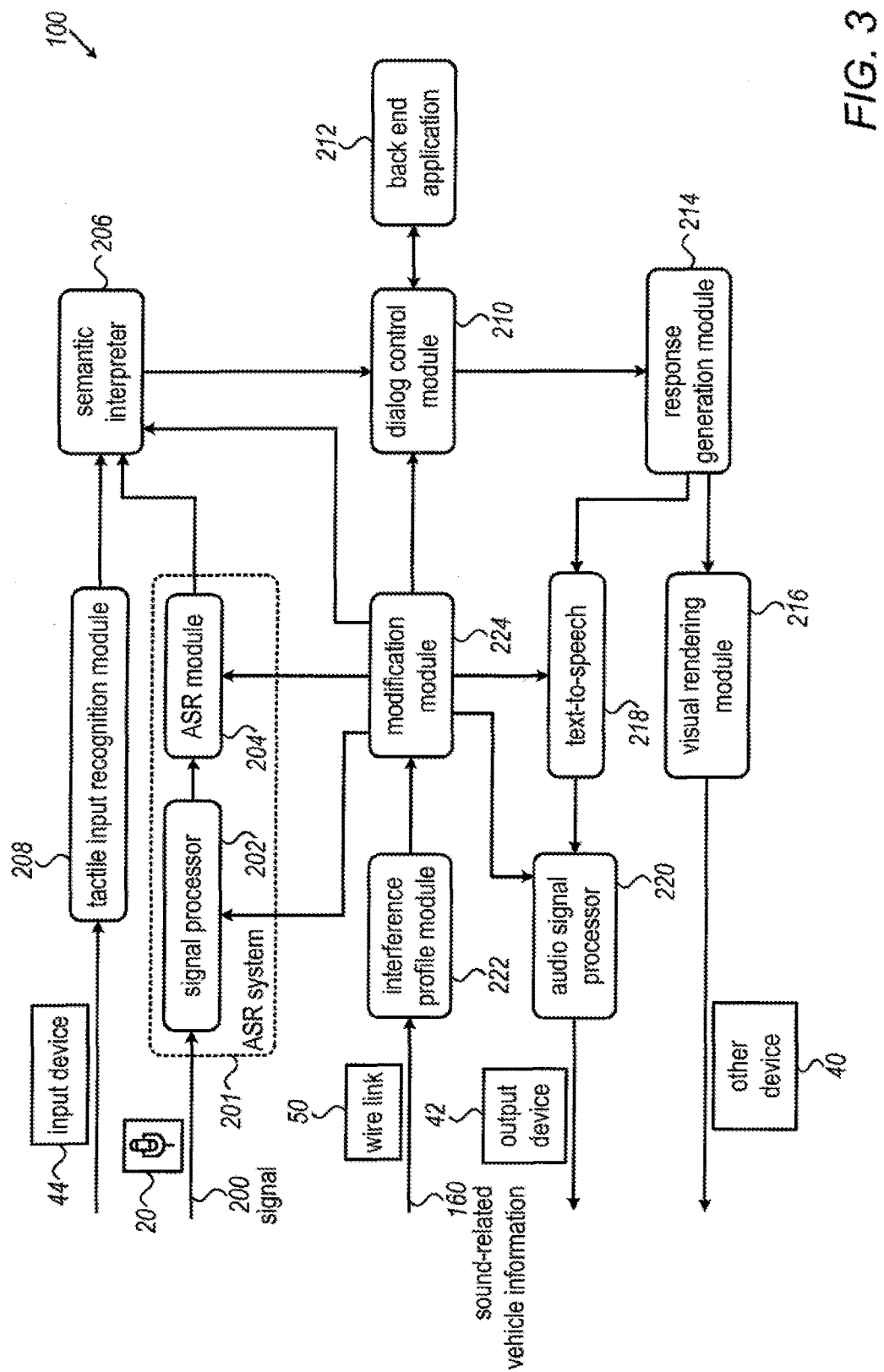
FIG. 3 is a block diagram of a spoken dialogue system according to embodiments of the present invention.

FIG. 3 is a block diagram of a spoken dialogue system according to embodiments of the present invention. The system of FIG. 3 may, for example, part of the system of FIG. 2, or of other systems, and may have its functionality executed by the system of FIG. 2, or by other systems. The components of the system of FIG. 3 may, for example, be dedicated hardware components, or may be all or in part code executed by processor 110. Microphone 20 or another input device may receive, record or measure sounds, noise, and/or speech in vehicle. The sounds may include speech, speech commands, verbal commands, or other expression from an occupant in vehicle 10. Microphone 20 may transmit or transfer an audio signal or signal 200 representing the input sounds, including speech command(s), to system 100, speech recognition system or process 201, or other module or system. Speech recognition system or process 201 may, for example, include a signal processor 202 (e.g., speech recognition front-end), speech recognition module 204, and other systems or modules. Audio signal 200 representing the input sounds, including speech command(s) may be output to an automatic speech recognition system 201, a signal processor or signal processing or signal processor 202 associated with system 100, an adaptation module, or other device. Signal processor 202 may, for example, receive the audio signal. Signal processor 202 may, for example, filter, amplify digitize, or otherwise transform the signal 200. Signal processor 202 may transmit the signal 200 to a speech recognition module or device 204. Automatic speech recognition (ASR) module or speech recognition module 204 may extract, identify, or determine words, phrases, language, phoneme, or sound patterns from the signal 200. Words may be extracted by, for example, comparing the audio signal to acoustic models, lists, or databases of known words, phonemes, and/or phrases. Based on the comparison, potential identified words or phrases may be ranked based on highest likelihood and/or probability of a match. ASR module 204 may output or transmit a signal 200 representing identified words or phrases to a semantic interpreter 206.

According to some embodiments, a vehicle occupant may enter a command or information into an input device 44. Input device 44 may transmit or output a signal representing the command or information to tactile input recognition module 208. Tactile input recognition module 208 may identify, decode, extract, or determine words, phrases, language, or phoneme in or from the signal. Tactile input recognition module 208 may, for example, identify words, phrases, language, or phonemes in the signal by comparing the signal from input 44 to statistical models, databases, dictionaries or lists of words, phrases, language, or phonemes. Tactile input recognition module 208 may output or transfer a signal representing identified words or phrases to semantic interpreter 206. The tactile signal may, for example, be combined with or compared to signal 200 from ASR module 204 in semantic interpreter 206.

According to some embodiments, semantic interpreter 206 may determine meaning from the words, phrases, language, or phoneme in the signal output from ASR module 204, tactile input recognition module 208 and/or another device or module. Semantic interpreter 206 may, for example, be a parser (e.g., a semantic parser). Semantic interpreter 206 may, for example, map a recognized word string to dialogue acts, which may represent meaning. Dialogue acts may, for example, refer to the ontology of an application (e.g., components of an application ontology). For example, user may provide a speech command or word string (e.g., "Find me a hotel,") and semantic interpreter 206 may parse or map the word string into a dialogue act (e.g., inform(type=hotel)). Semantic interpreter 206 may, for example, use a model that relates words to the application ontology (e.g., dialogue acts in application ontology). The model may, for example, be included in speech recognition grammar (e.g., in database 150, memory 120, or other location) and/or other locations. Speech recognition module 204 may identify the words in the statement and transmit a signal representing the words to semantic interpreter 206.

Dialogue acts, information representing spoken commands, and/or other information or signals may be output to a dialog control module 210.

Dialog control module 210 may, in some embodiments, generate, calculate or determine a response to the dialogue acts. For example, if a dialogue act is a request for information (e.g., inform(type=hotel)), dialog control module 210 may determine a response to the request providing information (e.g., a location of a hotel), a response requesting further information (e.g., "what is your price range?"), or other response. Dialog control module 210 may function in conjunction with or be associated with a backend application 212. A backend application 212 may, for example, be a data search (e.g., search engine), navigation, stereo or radio control, musical retrieval, or other type of application.

According to some embodiments, a response generator or response generation module 214 may, for example, receive response information from dialog control module 210. Response generation module 214 may, for example, formulate or generate text, phrasing, or wording (e.g., formulate a sentence) for the response to be output to a vehicle occupant.

A visual rendering module 216 may generate an image, series of images, or video displaying the text response output by response generation module 214. Visual rendering module 216 may output the image, series of images, or video to displays 44 or other devices.

A text to speech module 218 may convert the text from response generation module 214 to speech, audio signal output, or audible signal output. The speech signal may be output from text to speech module 218 to audio signal processor 220. Audio signal processor 220 may convert the signal from digital to audio, amplify the signal, uncompress the signal, and/or other modify or transform the signal. The audio signal may be output to speakers 40. Speakers 40 may broadcast the response to the vehicle occupants.

An interference profile module 222 may receive sound related vehicle information 160, vehicle parameters, received sound signals, and/or other information representing one or more sounds from data bus 50 or other sources. In some embodiments, data bus 50 may transmit or transfer sound related vehicle information 160 to interference profile module 222 associated with spoken dialogue system 100 or another module or device associated with system 100.

Interference profile records (IPR) 180 may be generated, determined, or calculated by interference profile module 222 based on the sound related vehicle information 160. Interference profile records 180 may include noise level parameters (e.g., sound intensity parameters), noise or sound type parameters, and/or other information. Noise level parameters, noise type parameters, and/or other parameters may be determined based on sound related vehicle information 160, received sounds, and/or other information representing sounds or noise. For example, sound related vehicle information 160 may indicate or represent that a heating, ventilation, and air condition (HVAC) system fan is on and operating at a high setting. An IPR 180 including a noise type parameter of fan (e.g., noise type=fan) and a noise level parameter of high (e.g., noise level=high) may, for example, be generated to represent sound related vehicle information 160 indicated an HVAC fan is on a setting of high. Other IPR's 180 including noise type parameters, noise level parameters, and other parameters may be generated. Noise level parameters and noise type parameters may represent a noise or sound in a vehicle or the likely presence of a noise or sound in vehicle, but typically do not include audio signals or recordings of the actual noise or sound.

According to some embodiments, modification module or steps 224 may, based on the noise level parameters, noise type parameters, and/or other parameters alter or modify the audio signal 200, filter noise, and/or otherwise modify automated speech recognition. Modification module 224 may, in some embodiments, modify an audio signal 200 by applying a filter to audio signal 200, determining an acoustic model to be used in speech recognition, and/or otherwise enhancing signal processing 202, speech recognition 204, or speech recognition steps or processes.

According to some embodiments, an interference profile record may, for example, be used by text to speech 218, audio processing 220, or other modules or methods to enhance audio speech prompting, audio output, or other sounds or broadcasts output from system 100. Text to speech 218 parameters or output may be modified (e.g., by modification module 224) by increasing or decreasing speech rate, increasing or decreasing syllable duration, and/or otherwise modifying speech output from system 100 (e.g., via speaker 40). Parameters associated with audio processing 220 (e.g., prompt level, prompt spectrum, audio playback, or other parameters) may be modified based on an interference profile record (e.g., noise type parameters, noise level parameters, and other parameters). Audio output from system may, for example, be modified by increasing prompt level (e.g., volume), altering prompt pitch, shaping or reshaping a prompt spectrum (e.g., to increase signal to noise ratio), enhancing audio playback (e.g., stereo playback), and/or otherwise enhancing or altering audio output from system 100 (e.g., via speaker 40).

A combination of text to speech 218, audio processing 220, and/or other types speech prompting or audio output modification 224 may be used. For example, Lombard style or other type of speech modification may be used. Lombard style modification may, for example, model human speech in a loud environment, an environment with background noise, or in a setting where communication may be difficult. Lombard style modification may, for example, modify audio spectrum, pitch, speech rate, syllable duration and other audio characteristics using audio processing 220, text to speech 218, or other modules and/or operations.

According to some embodiments, based on the noise level parameters, noise type parameters, and/or other parameters dialogue control 210 or other systems or processes associated with spoken dialogue system 100 may be modified and/or altered. Dialogue control 210 may, for example, be modified or altered (e.g., by modification module 224) by implementing or imposing clarification acts (e.g., asking a user for explicit confirmation of input, to repeat input, or other clarifications), determining and outputting introductory audio prompts (e.g., prompting user using output speech that voice recognition may be difficult with windows down, high engine RPM, or based on other vehicle parameter(s)), modifying prompts (e.g., controlling the pace or timing of prompts), modifying dialogue style (e.g., prompting user for single slot or simple information rather than complex information, enforcing exact phrasing, avoiding mixed initiative and other modifications), monitoring and responding to user confusion, and/or otherwise modifying dialogue control 210. In some embodiments, multi-modal dialogue (e.g., spoken dialogue combined with tactile, visual, or other dialogue) may, for example, be modified (e.g., by modification module 224). Multi-modal dialogue may, for example, be modified by reverting to, weighting, or favoring visual display over speech prompting, by reverting to visual display of system hypotheses (e.g., questions, requests for information, and other prompts), prompting or requesting tactile confirmation from a user (e.g., prompting a user to select a response from list of responses displayed on touchscreen or other output device), encouraging use of tactile modality (e.g., reducing confidence levels associated with semantic interpreter 206), switching from speech based to other modalities for a subset of application functions (e.g., simple command and control by tactile means), or other modifications. Back-end application functionality may be modified (e.g., by modification module 224) based on the interference profile records. For example, functionality of back-end application services or features may be locked out, reduced, or otherwise modified (e.g., lock out voice search, allow radio control, and other services).

Figure 4:
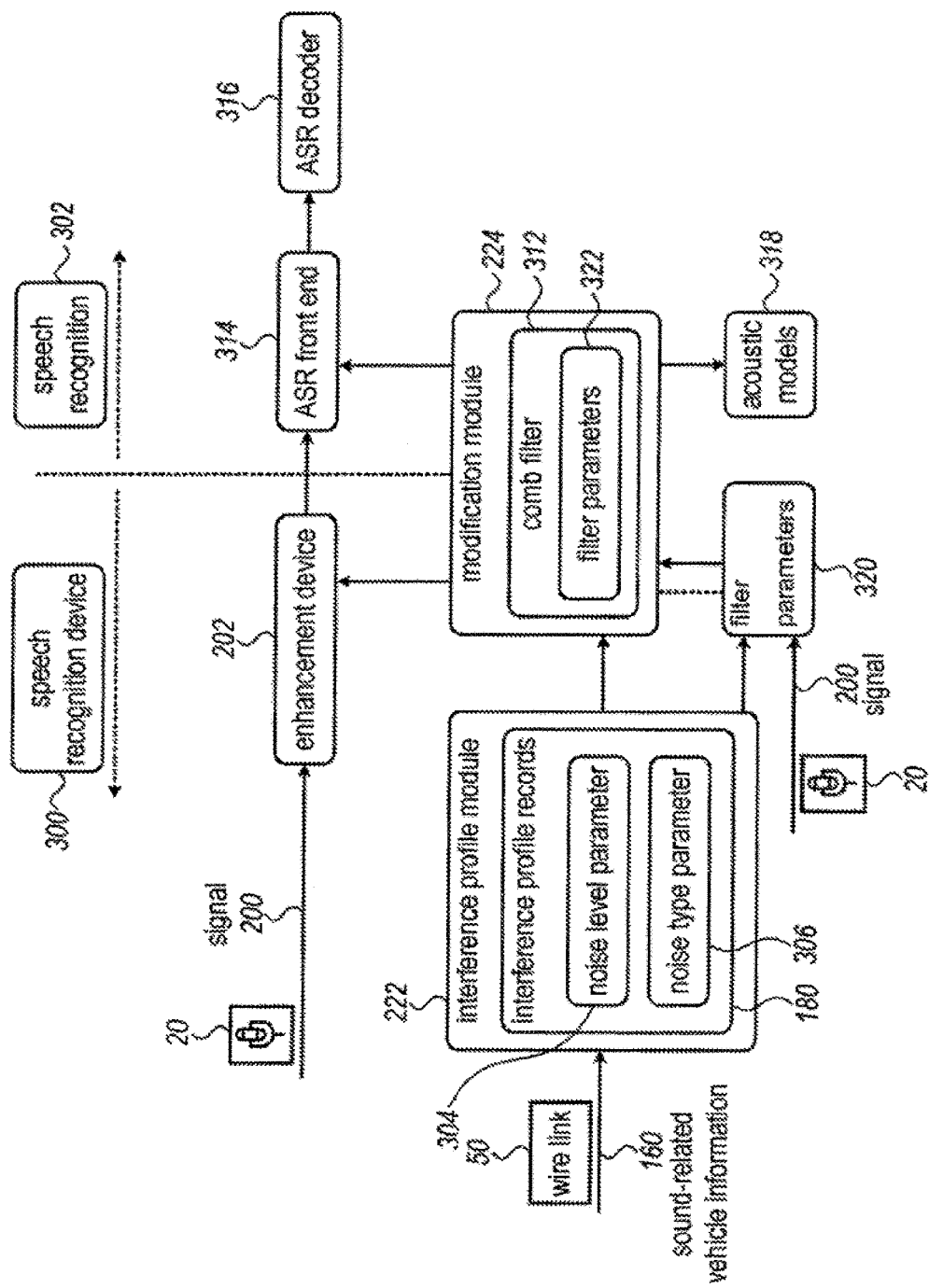
FIG. 4 is a block diagram of an automatic speech recognition system according to embodiments of the present invention.

FIG. 4 is a block diagram of an automatic speech recognition system according to embodiments of the present invention. According to some embodiments, an interference profile module 222 may receive sound related vehicle information 160 including or representing, for example, vehicle parameters and other information from a data bus 50. Vehicle parameters may, for example, include window position (e.g., open or closed, open a certain amount, etc.), engine settings (e.g., engine revolutions per minute (RPM)), vehicle speed, HVAC fan settings (e.g., off, low, medium, high), audio playback levels, or other vehicle related parameters. According to some embodiments, interference profile module 222 may receive sound related vehicle information 160 from microphones (e.g., exterior microphones 24, interior microphones 20, or other microphones). Sound related vehicle information 160 from microphones may, in some embodiments, include non-speech related sounds, vehicle related sounds, non-vehicle related sounds, infrastructure sounds, wind noise, road noise, speech from people outside vehicle cabin, environmental sounds, Interference module 222 may, for example, based on sound related vehicle information 160 generate interference profile records (IPR) 180.

Interference profile records 180 may, for example, be a table, data set, database, or other set of information. Each IPR 180 may, for example, be a representation of sound related vehicle information 160 (e.g., vehicle parameters and other sounds or information). An IPR 180 may, for example, include a noise level parameter 304 (e.g., sound intensity parameter), noise type parameter 306 (e.g., sound type parameter or noise classification parameter), and other parameters representing sound related vehicle information 160. In some embodiments, noise level parameter 304, noise type parameter 306, and other parameters may represent a combination of categories of sound related vehicle information 160 (e.g., vehicle parameters, received sounds, and/or other sounds or information). An IPR 180 including noise level parameters 304, noise type parameters 306, and/or other parameters may, for example, represent vehicle parameters (e.g., engine RPM, HVAC fan setting, window position, etc.) or vehicle related sounds in real-time, continuously, or over a predetermined period of time. Interference profile records 180 may, for example, be generated continuously, in real-time when spoken dialogue system 100 is activated, any time vehicle is powered on, or at other times.

Noise type parameter 306 may, for example, be a classification, categorization, label, tag, or information representing or derived from sound related vehicle information 160 including vehicle parameters (e.g., engine RPM, window position, HVAC fan setting, vehicle speed, audio playback level, and other parameters) and/or other information. Noise or sound type parameters 306 may, for example, be determined, generated or assigned based on signals (e.g., sound related vehicle information 160) received from CAN bus 50.

Signals received from CAN bus 50 may, for example, represent or include sound related vehicle information 160, which may represent vehicle parameters (e.g., vehicle window position, engine RPM, vehicle speed, HVAC fan setting, audio playback level, and other parameters) and/or other information. Noise type parameters 306 may, for example, represent a vehicle parameter, pre-defined combinations of vehicle parameters, or other information received from CAN bus 50. For example, if a signal is received from CAN bus 50 indicating engine RPM is higher than a threshold RPM value a noise type parameter 306 of engine (e.g., noise_type=Engine) may be generated or assigned. For example, a signal received via CAN bus 50 indicating that an HVAC system is at a certain setting may result in the generation or assignment of a noise or sound type parameter 306 of fan (e.g., noise_type=fan). For example, sound related vehicle information 160 indicating a window is open may result in the assignment of a noise type parameter 306 window (e.g., noise_type=window). Other noise type parameter 306 determinations, assignments, and classifications may be used.

Noise level parameters 304 may, for example, be derived from vehicle parameters including (e.g., fan dial or input setting, HVAC system setting, engine RPM, vehicle speed, audio playback level, and/or other vehicle parameters). Noise level parameters 304 may, for example, be a representation of sound level (e.g., the decibel (dB) level of the sound) or other measure of sound level or feature. Noise level parameters 304 may, for example, be low, medium, high or other parameters and may represent or quantify ranges of sound intensity.

Interference profile records 180 (e.g., noise level parameters 304 and noise type parameters 306) may, in some embodiments, be determined, generated, or calculated using logic (e.g., using metrics or thresholds), mathematical approaches, a table (e.g., a look-up table), or other operations. For example, if sound related vehicle information 160 indicates engine RPM is above a predefined threshold, a noise type parameter 306 of engine (e.g., noise_type=engine) and noise level parameter 304 of high (e.g., noise_level=high) may be determined or generated. For example, if vehicle parameters from data bus indicate an HVAC fan is on a high setting, a noise type parameter 306 equal to fan (e.g., noise_type=fan), noise level parameter 304 of high (e.g., noise_level=high), and/or other parameters may be assigned. Other operations may be used. Typically, a noise type parameter is a discrete parameter selected among a list, e.g., engine, window open, fan, wind, audio, audio, etc. However, other noise type parameters may be used. A noise type parameter and noise level parameter typically does not include a sound recording or other direct information regarding the actual noise produced.

In some embodiments, combinations of multiple types of sound related vehicle information 160 (e.g., vehicle parameters, measured sounds, and other sounds or information) may, in some embodiments, be used in logic operations and/or other mathematical operations to determine or calculate interference profile records 180 (e.g., noise level parameters 304 and noise type parameters 306). For example, if sound related vehicle information 160 from data bus indicates vehicle speed is greater than a threshold speed (e.g., 70 miles per hour (mph) or another speed) and window position is beyond a threshold (e.g., more than 25% open or another threshold), a noise level parameter 304 of high (e.g., noise_level=high) and noise type parameter 306 equal to wind (e.g., noise_type=wind) may be determined, assigned, or generated. Other thresholds and parameters may be used.

Interference profile records 180 may, in some embodiments, be determined, generated, or calculated using quantization or other operations. Sound related vehicle information 160, vehicle parameters, measured sounds, or other information may, for example, be quantized to determine noise level parameter 304 values and noise type parameter 306 values. For example, engine RPM values may be quantized to an 8 bit or other size integer noise level parameter 304 values. Noise level parameter 304 (e.g., 8 bit integer representing engine noise) may, for example, include information about engine characteristics (e.g., engine fundamental frequencies and harmonics). Audio playback levels, for example, may be quantized to 8 bit or other size integers. Each 8 bit integer may, for example, represent an interference profile record 180 (e.g., a noise level parameter 304). Other quantization steps may be used.

According to some embodiments, modification module or processes 224 may, based on interference profile records 180, modify audio signals 200, filter noise, and improve spoken dialogue system 100 function. Modification module or processes 224 may, in some embodiments, modify an audio signal 200, filter noise, modify features of an audio signal 200, and/or otherwise alter an audio signal 200 independent of speech recognition device 300 (e.g., prior to speech recognition 204), dependent on speech recognition 302 (e.g., during speech recognition 204 using, for example, ASR front end 314), or during other steps or process.

In some embodiments, an audio signal 200 (e.g., output from microphone 20) may be modified, filtered, or altered independent 300 of or before being received in speech recognition module 204. System 100 may, for example, include multiple filters 312 (e.g., Weiner filters, comb filters, analog, digital, passive, active, discrete-time, continuous time, and other types of filters) and each filter 312 may include filter parameters 322. Filters 312 may, for example, be stored in memory 120, database 150, long-term storage 130, or a similar storage device. Each filter 312 and filter parameters 322 may, for example, function best to filter certain noise level parameters 304 and noise type parameters 306. Audio signal 200 may, for example, be modified and/or altered during signal processing 202. Audio signal 200 may be modified during signal processing 202 based on interference profile records 180 (e.g., noise type parameters 306 and noise level parameters 304). Based on noise type parameters 306, modification module 310 may, for example, determine a filter 312 (e.g., a Weiner filter, comb filter, low pass filter, high pass filter, band pass filter, or other type of filter) or other module or device to filter, limit, or reduce interference noise. Filter parameters 322 (e.g., frequencies, amplitude, harmonics, tunings, or other parameters) may, for example, be determined based on noise level parameters 304. Filter 312 may be applied to an input signal, audio signal 200, or other type of signal in signal processor 202 or in another module or step.

According to some embodiments, if IPRs 180 indicate wind noise (e.g., noise_type=wind) may be present, a filter 312 (e.g., Weiner filter) may be applied by signal processor 202 to filter or reduce wind noise in the audio signal 200. Weiner filter parameters 322 may, in some embodiments, be determined based on noise level parameters 304 (e.g., noise_level=high, medium, low, or off), noise type parameters 306, and other parameters. For example, modification module 224 may include predetermined Weiner filter parameters 322 to apply during signal processing 202 based on a given noise level parameter 304. After application of filter 312 (e.g., Weiner filter), audio signal 200 may, for example, be output to automated speech recognition (ASR) module 204 with reduced or limited wind noise in the signal.

According to some embodiments, if IPR's 180 indicate engine noise (e.g., noise_type=engine) may be present, a time varying comb filter 312 may be applied during signal processing 202 to filter out engine noise. Time varying comb filter 312 parameters may, for example, be determined based on noise level parameter 304 (e.g., 8 bit integers representing engine noise). Noise level parameter 304 (e.g., 8 bit integer representing engine noise) may, for example, include information about engine characteristics (e.g., engine fundamental frequencies and harmonics). Based on noise level parameter 304, time varying comb filter 312 parameters may, for example, be determined. Time varying comb filter parameters 322 may, for example, be determined such that comb filter is aligned with fundamental frequencies and harmonics in the engine noise portion of audio signal 200. Time varying comb filter with parameters 322 aligned with fundamental frequencies and harmonics in the engine noise portion of an audio signal 200 may attenuate or reduce the intensity of engine fundamental frequencies and harmonics in an audio signal 200 transform (e.g. a signal Fourier transform). A signal 200 with attenuated or reduced fundamental engine frequencies and amplitudes may, for example, be output to an automated speech recognition decoder 316. Automated speech recognition decoder 316 may interpret speech, commands, or other information in the audio signal 200.

According to some embodiments, success of speech recognition modification based on the noise type parameters and the noise level parameters in increasing speech recognition functionality may be measured. Based on the measure success speech recognition modification may be adapted (e.g., during a learning or supervised learning operation).

According to some embodiments, filter parameters 322 (e.g., Weiner filter, comb filter, etc.) used with given interference profile records 180 (e.g., noise type parameters 306 and noise level parameters 304) may be defined during manufacturing, during an adaptation process 320 (e.g. a learning or supervised learning operation), or at another time. Filter parameters 322 may, for example, be determined such that filter 312 is most effective in removing noise from an audio signal 200. During an adaptation process 320, a signal 200 and IPR(s) 180 associated with signal 200 may be received at system 100 (e.g., at an adaptation module 320). Signal 200 may, for example, include speech, noise, and possibly other sounds. Interference profile record(s) 180 associated with signal 200 may, for example, be output from data bus 50 concurrently with or at roughly the same time as signal 200 is received. An adaptation module 320 may, for example, measure how effective filter parameters 322 (e.g., derived from or determined based on IPRs 180) are in removing noise from signal 200 by comparing signal 200 to a signal output from filter 312 (e.g., operating with predefined filter parameters 322) or using on other methods. The success or effectiveness of filter parameters 322 in improving speech recognition may be measured using other approaches and/or metrics. Adaptation module 320 may based on the measurement change or adapt filter parameters 322 to more effectively remove noise from signals 200 associated with a given IPR 180 (e.g., given noise type parameters 306 and noise level parameters 304). Adaptation steps 320 may, for example, be performed while vehicle is driven by a driver or at other times and filter parameters 322 may be adapted based on the supervised learning or other methods.

For example, during an adaptation process 320 a vehicle may be driven above a predefined threshold speed with the windows open and a noise level parameter 304 of high and noise type parameter 306 of wind (e.g., noise_type=wind) may be generated. Signals 200 including speech and other noise (e.g., vehicle related noises) may be received at system 100 (e.g., from microphone 20) during adaptation operation 320. An adaptation module 320 may, for example, measure how effective filter parameters 322 (e.g., based on noise type parameters 306 and noise level parameters 304) are in removing noise from signal 200. In some embodiments, how effective filter parameters 322 are in removing noise from signal 200 may be measured by comparing signal 200 to a signal output from filter 312 (e.g., operating with predefined filter parameters 322) or using other methods. Filter parameters 322 associated with noise type parameters 306 and noise level parameters 304 may, for example, be adapted or changed to more effectively filter or remove noise from signal 200. Filter parameters 322 associated with noise type parameters 306 and noise level parameters 304 may, in some embodiments, not be changed or adapted if filter parameters 322 as measured are effective or successful in removing noise from signal. Success or effectiveness of filter parameters 322 may, for example, be determined by evaluating the performance or function of speech recognition 204 given filter parameters 322. Other approaches and metrics may be used.

According to some embodiments, modification module 310 may modify an audio signal 200 within modules and/or devices in speech recognition module 204. Audio signal may 200, for example, be received from microphone 20 or similar device and may include speech from vehicle occupants (e.g., passengers, drivers, etc.) and other sounds (e.g., background noise, vehicle related sounds, and other sounds). Speech recognition module 204 may, for example, include an automatic speech recognition (ASR) front-end 314. Based on IPR's 180 signals may be modified at ASR front end 314 to filter out noise (e.g., wind noise, engine noise or another type of noise) or to otherwise modify audio signal 200. A filter 312 (e.g., a Weiner filter) may, for example, be applied to signal 200 in ASR front-end 314 to filter wind noise from an audio signal 200. The type of filter 312 and filter parameters 322 may be determined based on noise type parameter 306 and noise level parameter 304. For example, a vehicle 10 may travel at a speed above a threshold speed with windows open and noise type parameter 306 wind and noise level parameter 304 of high may be generated. Based on the noise type parameter 306 of wind and noise level parameter 304 of high, a filter 312 (e.g., a Weiner filter) with predefined filter parameters 322 may be applied to signal 200 in ASR front-end 314.

According to some embodiments, automatic speech recognition module 204 may include acoustic models 318. A specific previously generated acoustic model among multiple acoustic models 318 may be chosen during sound analysis to decode speech, the model being chosen depending on, for example, interference profile records 180 (e.g., noise level parameters 304 and/or noise type parameters 306). Acoustic models 318 may be or may include statistical models (e.g., Hidden Markov Model (HMM) statistical models or another statistical models) representing the relationship between phonemes, sounds, words, phrases or other elements of speech and their associated or representative waveforms.

According to some embodiments, IPR's 180 (e.g., noise level parameters 304, noise type parameters 306, or other parameters) may be used to determine, choose or select which acoustic model 318 to use in a speech recognition operation. For example, an IPR 180 (e.g., noise level parameter 304 of high and noise type parameter 306 of window) may indicate high window noise in a signal. Modification module 310 may based on IPR 180 indicating high window noise, select or determine an acoustic model 318 among several acoustic models 318 that is best suited to decoding speech in a signal with high window noise.

Acoustic models 318 may, for example, be adapted, trained or generated from speech samples during an adaptation operation 320, manufacturing, testing, or at another time. Acoustic models 318 may, for example, be adapted during adaptation operation 320 (e.g., a supervised learning operation) based on noise level parameters 304 and the noise type parameters 306. An adaptation module 320 may, for example, measure how effective an acoustic model 322 (e.g., determined based on IPRs 180) is in decoding speech from signal 200. The success of an acoustic model 322 (e.g., including predefined acoustic model transformation matrices) in improving speech recognition may me be measured and an acoustic model 322 may be adapted based on the measurement. Acoustic model 322 may, for example, be adapted using maximum likelihood linear regression or other mathematical approaches to adapt or train acoustic model transformation matrices used in conjunction with predefined noise type parameters 306 and noise level parameters 304.

For example, during an adaptation or training operation vehicle 10 may be driven above a threshold speed with windows open. A noise level parameter 304 of high and noise type parameter 306 of wind (e.g., noise_type=wind) may be generated and output to adaptation module 320. Speech and other noise may be recorded (e.g., by microphone 20) and a signal 200 including speech may be output to adaptation module 320. The success of acoustic model 318 in decoding speech based on the noise type parameter 306 of wind (e.g., noise_type=wind) and noise level parameter 304 of high (e.g., noise_level=high) may be measured. Based on the measurements acoustic model transformation matrices may be generated or adapted using maximum likelihood linear regression techniques or other mathematical or statistical approaches. An acoustic model 318 with adapted acoustic model transformation matrices may, for example, be used in subsequent system 100 operation when interference profile records 180 indicating high wind noise (e.g., noise type parameter 306 of wind and noise level parameter 304 of high) are generated.

Adaptation 320 (e.g., including supervised learning) may, for example, be performed while vehicle 10 is driven by a driver, and acoustic models 318 may be altered or modified based on the supervised learning. An acoustic model 318 best suited to decoding speech in a signal with high window noise may, for example, have been trained or defined during a supervised learning operation with high wind noise.

Figure 5:
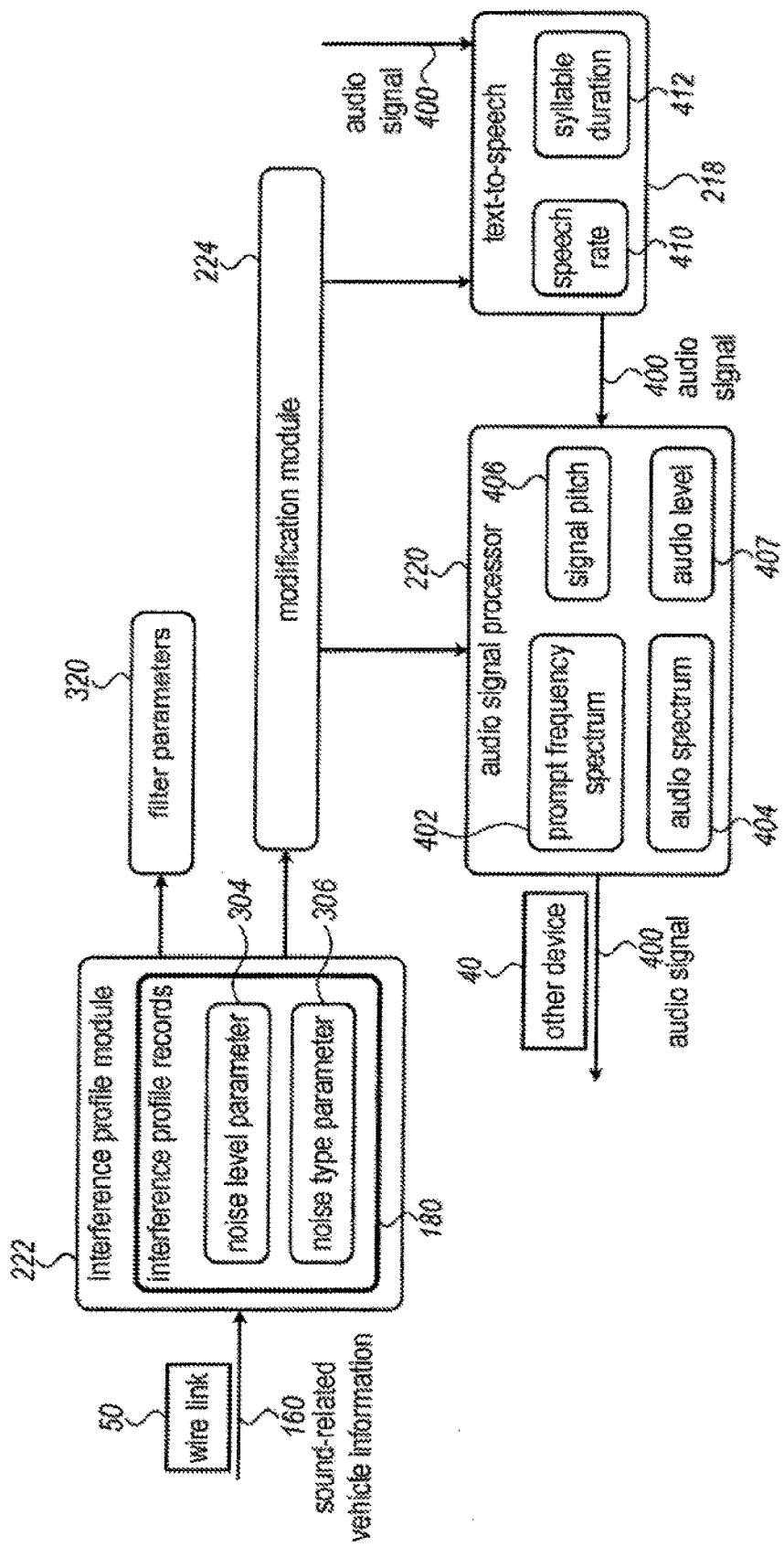
FIG. 5 is a block diagram of a spoken dialogue prompting system according to embodiments of the present invention.

FIG. 5 is a block diagram of an enhanced spoken dialogue audio prompting system according to embodiments of the present invention. According to some embodiments, interference profile records 180 (e.g., including noise type parameters 306 and noise level parameters 304) may be used to modify an audio signal 400 (e.g., output from system 100). Interference profile records 180 (e.g., noise type parameters 306 and noise level parameters 304) may be used by text to speech 218, audio processing 220, or other modules or methods to enhance speech prompting, audio output, or broadcasts output from system 100.

According to some embodiments, modification module 224 may modify parameters associated with audio processing 220 (e.g., prompt level, prompt spectrum, prompt pitch, audio spectrum, audio level, or other parameters) based on an interference profile records 180 (e.g., noise type parameters 306, noise level parameters 304, and other parameters). Modification module 224 may, for example, increase prompt level (e.g., volume), alter prompt pitch, shape and/or reshape prompt spectrum (e.g., to increase signal to noise ratio), enhance audio playback (e.g., stereo playback), and/or otherwise enhance or alter audio output from system 100 (e.g., via speaker 40). For example, if noise level parameters 304 indicate noise in signal 400 is above a threshold level (e.g., dB level), prompt level (e.g., output from speaker 40) audio level 407 may be increased.

In some embodiments, a prompt spectrum 402 may, for example, be modified, shaped, or reshaped. A prompt may be an audio or sound output from system 100 including, for example, speech directed to vehicle occupants, and a prompt spectrum 402 may, for example, be an audio spectrum including a range of frequencies, intensities, sound pressures, sound energies, and/or other sound related parameters. Prompt spectrum 402 may, for example, be modified, shaped, or reshaped to increase the signal to noise ratio in vehicle 10 (e.g., in vehicle interior or in proximity of vehicle occupants). Prompt spectrum 402 may, for example, be modified to emphasize or amplify the prompt spectrum 402 in portions of spectrum (e.g., frequency spectrum, energy spectrum, or other type of sound related spectrum) corresponding to high noise energy from vehicle related sounds (e.g., engine noise, wind noise, fan noise, and other sounds). Prompt spectrum 402 may, for example, be amplified in a portion of the spectrum with high noise energy to increase the signal to noise ratio, which may represent the ratio of prompt sound level (e.g. prompt output from system 100) to noise level in vehicle interior (e.g., engine noise, wind noise, HVAC fan noise, and other noise). Prompt spectrum 402 may, for example, be modified using audio processor module 220, text to speech module 218, or another system or module.

In one embodiment, noise type parameters 306 may indicate engine noise (e.g., noise_type parameter=engine) and noise level parameters 304 may represent a level of engine noise. Noise level parameters 304 may, for example, be a quantized representation of engine RPM (e.g., an 8 bit integer or other integer representing engine RPM). Based on noise level parameters 304 (e.g., a quantized representation of engine RPM), modification module 224 may amplify or emphasize predefined portions of prompt spectrum 402. For example, noise type parameters 306 and noise level parameters 304 may correspond to high noise energy in low frequency portion of a sound spectrum (e.g., below 1000 Hertz (Hz) or another frequency) and low noise energy in high frequency portion of the spectrum (e.g., above 1000 Hertz (Hz) or another frequency). The low frequency portion of prompt frequency spectrum 402 (e.g., below 1000 Hz or another frequency) may be amplified or emphasized to increase the ratio of prompt to engine noise in low frequencies.

In some embodiments, audio spectrum 404 (e.g., from stereo, radio or other device) may, for example, be modified or reshaped. Audio spectrum 404 may, for example, be modified or reshaped to increase the audio signal to noise ratio in vehicle 10. Audio spectrum 404 may, for example, be modified using audio processing module 220 and/or another device or module. Audio spectrum 404 may, for example, be modified to emphasize or amplify the audio spectrum 404 in portions of audio spectrum 404 (e.g., audio frequency spectrum, audio energy spectrum, or other type of sound related spectrum) corresponding to high noise energy from vehicle related sounds (e.g., engine noise, wind noise, fan noise, and other sounds). Audio spectrum 404 may, for example, be amplified in a portion of spectrum with high noise energy to increase the signal to noise ratio, which may represent the ratio of audio (e.g. audio output from speaker 40) to noise in vehicle interior.

According to some embodiments, audio prompt or audio pitch 406 may be modified or altered based on interference profile records 180. Prompt or audio pitch 406 may, for example, be modified based on noise type parameters 306 and noise level parameters 304 to increase the clarity and/or intelligibility of a prompt or audio (e.g., output from speakers 40). For example, noise type parameters 306 may indicate the presence of wind noise in vehicle 10 and noise level parameters 304 may represent a level of wind noise (e.g., volume of wind noise). Based on noise level parameters 304 (e.g., low, medium, high, or another parameter), the prompt or audio pitch 406 (e.g., related to frequency) may be altered (e.g., made higher or lower). Alteration of prompt or audio pitch 406 may, for example, be dependent upon, proportional to, or otherwise related to noise level parameter 306. For example, prompt or audio pitch 406 may be altered more in the presence of louder vehicle noises than softer vehicle noises (e.g., may be shifted higher if noise level parameter 304 is high than if noise level parameter 304 is medium or low). In some embodiments, prompt or audio pitch 306 may be decreased or shifted lower based on noise type parameters 306 and noise level parameters 304.

According to some embodiments, modification module 224 may, for example, modify text to speech 218 output by increasing or decreasing speech rate 410, increasing or decreasing syllable duration 412, and/or otherwise modifying speech output from system 100 (e.g., via speaker 40). Speech rate 410 may, for example, be modified based on noise type parameters 306, noise level parameters 304, and/or other information. Speech rate 410 may, for example, be modified to decrease speech rate 410 of a prompt in high noise conditions (e.g., if noise level parameter 306 is high or another value). Decreasing speech rate 410 may, for example, increase intelligibility of spoken dialogue in a loud or high noise environment (e.g., in a vehicle with loud vehicle related sounds). Speech rate 410 may, in some embodiments, be increased based on noise type parameters 306 and noise level parameters 304 to increase intelligibility of a spoken dialogue audio prompt output from system 100.

According to some embodiments, prompt syllable duration 412 may, for example, be modified based on noise type parameters 306, noise level parameters 304, and/or other information. Prompt syllable duration 412 may, for example, include the duration of pronunciation of consonants, vowel, and/or other syllables associated with human speech. Syllable duration 412 may, for example, be increased in proportion to, dependent upon, or in relation to noise level parameters 304. For example, syllable duration 412 may be increased (e.g., duration of syllable pronunciation may be longer) in relation to an increase in vehicle related sounds (e.g., engine noise, HVAC system noise, wind noise and other sounds) represented by noise type parameters 306 and noise level parameters 304.

In some embodiments, a combination of text to speech 218, audio processing 220, and/or other types speech prompting or audio output may be modified. Modification module 224 may, for example, use Lombard style or other speech modification. Lombard style modification may model human speech modification or compensation in a loud environment, environment with high background noise, or other high noise level environment. Lombard style modification may, for example, include any combination of signal 400 modification selected from the group including modifying the prompt signal spectrum 402, modifying the prompt signal pitch 406, modifying the prompt signal speech rate 410, and modifying the prompt signal syllable duration 412. Lombard style modification may, for example, be dependent on noise type parameters 306, noise level parameters 304, and other information. For example, noise type parameters 306 of wind (e.g., noise_type=wind) and noise level parameters 304 of high may be generated indicating high wind noise may be present. Based on noise type parameters 306 and noise level parameters 304, a predefined combination of prompt spectrum 402, prompt pitch 406, prompt speech rate 410, prompt syllable duration 412, and/or other prompt parameters may be modified to increase intelligibility of the prompt. The predefined combination applied given a combination of noise type parameters 306 and noise level parameters 304 may, for example, be determined during manufacturing, testing, an adaptation 320, or another process. The predefined combination may, for example, be the combination which best increases the intelligibility, understandability, or clarity of spoken prompt.

According to some embodiments, prompt modification may be adapted 320 to improve the clarity and/or intelligibility of prompts. The effectiveness or affect of prompt modification 224 associated with predefined noise type parameters 306, noise level parameters 304, and other parameters may be measured and adapted or changed based on the measurement. The effectiveness of prompt modification may, for example, be measured by monitoring user or occupant response to modified prompts. For example, a prompt may be modified based on noise type parameters 306, noise level parameters 304, and/or other parameters and occupant response to the prompt may be measured. For example, a prompt may elicit or request a response from an occupant. If the occupant does not respond to prompt, responds to the prompt in an unpredicted manner (e.g., provides a confused response), or performs other actions, it may be determined that prompt modification 224 could be adapted to improve the clarity of prompts. In one example, prompt modification 224 may, for example, be adapted by disabling prompt modification 224. For example, if it is determined that prompt modification 224 does not improve the clarity or intelligibility of speech prompting, prompt modification 224 (e.g., prompt modification module) may be disabled or deactivated. In one example, prompt modification 224 may be modified by altering prompt modification parameters (e.g., spectrum, pitch, speech rate, syllable duration, and/or other prompt modification parameters). For example, prompt spectrum 402 modification parameters may be adapted or changed to improve the clarity of spoken prompts. Prompt spectrum 402 modification parameters may, for example, be adapted to strengthen or enhance prompt signal 400 in a different part of the prompt spectrum 402. Other adaptation methods may be used.

Figure 6:
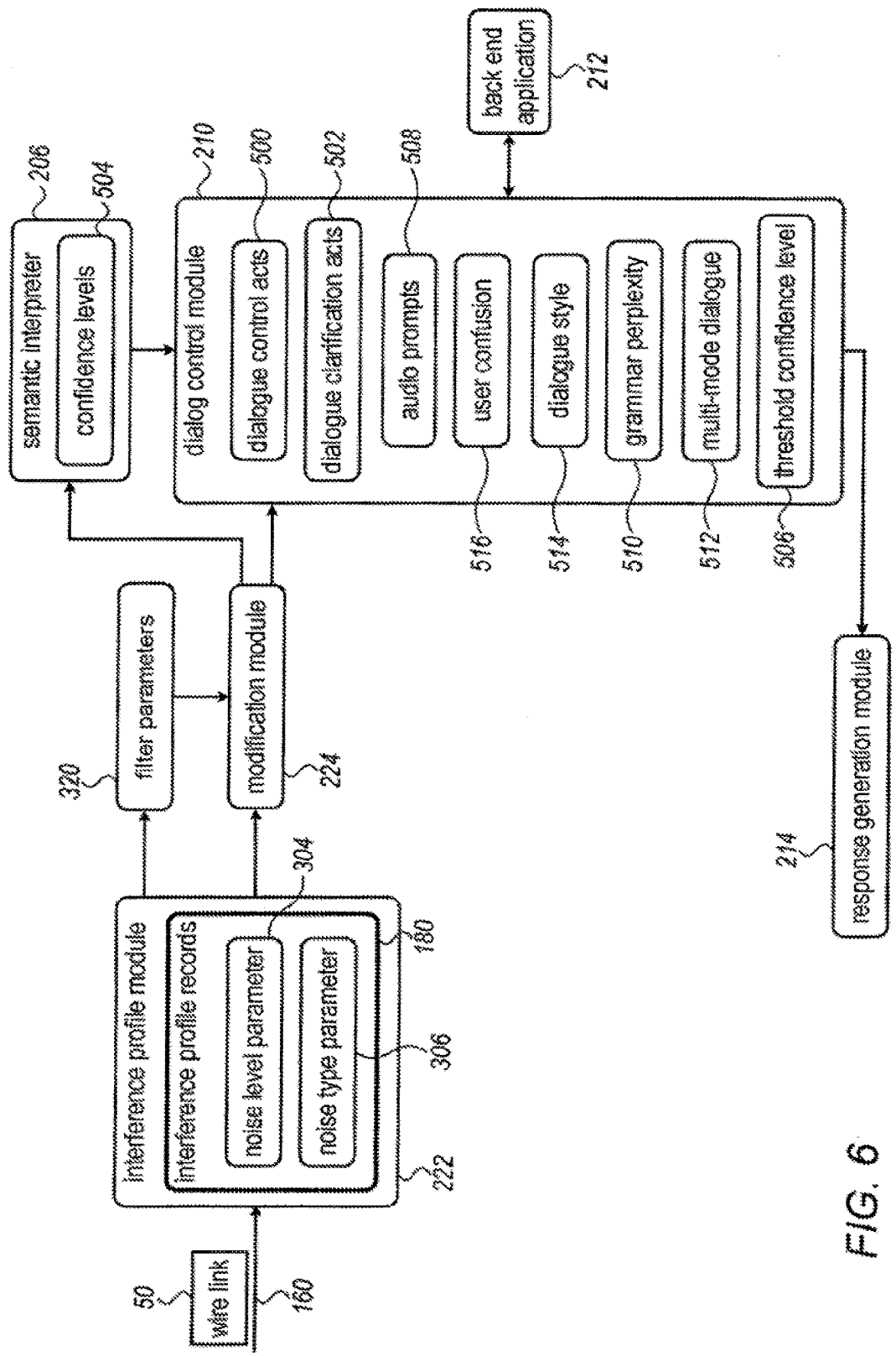
FIG. 6 is a block diagram of a spoken dialogue system according to embodiments of the present invention.

FIG. 6 is a block diagram of a spoken dialogue control system according to embodiments of the present invention. According to some embodiments, dialogue control 210 or other systems or processes associated with spoken dialogue system 100 may be modified or altered 224 based on noise type parameters 304, noise level parameters 306, and/or other parameters.

Dialogue control acts 500 may be modified 224 based on interference profile records 180 (e.g., noise type parameters 306, noise level parameters 304, and/or other parameters).

Dialogue control acts 500 may, for example, be operations performed by dialogue control 210 module and may include prompts output to a user, actions related to determination of input or output, or other operations. Dialogue control acts 500 may for example include clarification acts 502, reducing semantic interpreter confidence levels 504, and other processes or operations. Dialogue control acts 500 may, for example, be modified based on interference profile records 180 (e.g., noise type parameters 306, noise level parameters 304, and/or other parameters) by implementing clarification acts 502. Clarification acts 502 may, for example, be implemented or imposed if noise type parameters 306 and noise level parameters 304 indicate high noise may be present in proximity to vehicle 10 (e.g., in vehicle cabin).

According to some embodiments, clarification acts 502 may include explicit confirmation of user input, audio prompting or asking a user to repeat input, or otherwise prompting a user to clarify input. An audio prompt 508 requesting explicit confirmation of user input may, for example, be output (e.g., using speaker 40). For example, a user may ask (e.g., input speech to spoken dialogue system requesting information) spoken dialogue to find a restaurant (e.g., "Where is the closest restaurant?"). If noise type parameters 306 and noise level parameters 304 indicate high levels or noise (e.g., high levels of vehicle related noise or sounds) are present, spoken dialogue module 210 may, for example, output a prompt requesting confirmation of user's statement. An audio prompt 508 may, for example, be output asking user to confirm that user is looking for a restaurant (e.g. "did you say 'where is the closest restaurant?'"). If noise type parameters 306 and noise level parameters 304 indicate background noise may be present, prompts 508 may be output requesting explicit confirmation of user input each time a user provides input, when user input is unintelligible, or at other times. Other clarification acts and prompts may be used.

According to some embodiments, clarification acts 502 may include asking or requesting a user to repeat input. Dialogue control module 210 may, for example, output a prompt requesting a user to repeat their input. If, for example, user asks spoken dialogue system 100 to find the closest hotel (e.g., "where is the closest hotel?") and noise type parameters 306 and/or noise level parameters 304 indicate high noise levels may occur (e.g., noise_level=high), a prompt may be output requesting that user repeat their input. A prompt 508 may, for example, be output asking user to repeat their statement (e.g., "please repeat", "I didn't hear that, please say that again", or other requests for repetition). If noise type parameters 306 and noise level parameters 304 indicate background noise may be present, a prompt 508 may be output requesting user to repeat their input each time user provides input, when user input is unintelligible, or at other times. Other clarification acts 502 may be used.

According to some embodiments, clarification acts 502 may be encouraged and/or the likelihood of clarification acts 502 may be increased by altering semantic interpreter confidence levels 504 (e.g., by reducing confidence levels 504 or otherwise altering confidence levels 504). Confidence levels 504 may be altered or modified based on noise type parameters 306 and noise level parameters 304. Confidence levels 504 may, for example, represent the likelihood or certainty that a word string, phrase, or other spoken input (e.g., "find me a hotel") from a user matches or corresponds to a dialogue act (e.g., inform(type=hotel)) in spoken dialogue system ontology 170. A confidence level 504 may, for example, be a percentage, numerical value, or other parameter representing a confidence, likelihood, or probability that a word string matches a dialogue act in spoken dialogue system ontology 170. A confidence level 504 may, for example, be associated with a dialogue act generated by semantic interpreter 206. Dialogue acts and associated confidence levels 504 may, for example, be output from semantic interpreter 206 to dialogue control module 210. Dialogue control module 210 may, for example, based on dialogue acts and associated confidence levels 504 generate a response to be output to user. If, for example, confidence level 504 is below a threshold confidence level 506, dialogue control module 504 may implement clarification acts 502 (e.g., requesting explicit confirmation of user input, requesting user to repeat input, and other clarification acts). If confidence level 504 associated with a dialogue act is above a threshold confidence level 506, the dialogue act may be deemed to be a correct interpretation of user's input (e.g., user's spoken dialogue converted into a word string) and dialogue control module 210 may, for example, generate a response, perform an action, or otherwise respond to the dialogue act.

According to some embodiments, confidence levels 504 output from semantic interpreter 206 may, for example, be modified or reduced based on noise type parameters 306, noise level parameters 304, and/or other information. For example, if noise level parameters 304 indicate vehicle related noise above a predefined threshold may be present (e.g., noise_level=medium, noise_level=high, or other noise_level value), confidence levels 504 output from semantic interpreter may be reduced. In some embodiments, a confidence level 504 may, for example, be reduced from ninety percent (e.g., 90%) to, for example, eighty percent (e.g., 80%) or another value if noise type parameters 306 and/or noise level parameters 304 indicate moderate to high noise levels may occur in vehicle 10 (e.g., in vehicle passenger compartment). Other confidence levels 504 may be used.

Reduction in confidence levels 504 may, for example, be non-linear. Confidence levels 504 above a predefined boundary confidence level may, for example, not be reduced or altered regardless of whether noise type parameters 306 and/or noise level parameters 304 indicate background noise may be present. For example, confidence levels 504 (e.g., associated with dialogue acts) above a boundary threshold (e.g., ninety-five percent or another value) may not be altered or reduced while confidence levels 504 below a boundary threshold (e.g., ninety-five percent or another value) may be reduced. Other boundary thresholds may be used.

According to some embodiments, modification of dialogue control acts 500 given interference profile records (e.g., noise type parameters 306, noise level parameters 304, and other information) may be adapted 320. Modification 224 of dialogue control acts 500 (e.g., implementing clarification acts 502, reducing confidence levels 504, and other modifications) may, for example, be adapted by measuring correlations between noise type parameters 306 and/or noise level parameters 304 and dialogue control 210 success or functionality. An optimal modification of dialogue control 210 for a given interference profile record 180 may, for example, be determined in an adaptation process 320. An optimal modification of dialogue control for a given interference profile record 180 may be the modification which is least cumbersome to a user and/or best improves system 100 functionality. For example, noise type parameters 306 and noise level parameters 304 may indicate that high wind noise may be present and semantic interpreter confidence levels 504 may be modified 224 based on the noise type parameters 306 and noise level parameters 304. Dialogue control 210 function (e.g., success of dialogue control 210 or dialogue control 210 success) with modified confidence levels 504 may be measured. Dialogue control 210 function or success may, for example, be measured based on whether dialogue control 210 outputs an appropriate response to user input. For example, if user inputs a request for the location of the closest gas station (e.g., "where is the closest gas station?"), a dialogue control 210 response listing gas stations would be deemed a dialogue success while an off topic audio prompt 508 (e.g., "the closest restaurants are restaurant A and restaurant B") output from dialogue control 210 would not be considered a success. Other success measurement approaches may be used. Based on the measurement of dialogue control 210 function or success, dialogue control acts 500 given interference profile records 180 may adapted to improve the function of dialogue control 210 system. For example, adaptation 320 may determine that clarification acts 502 (e.g., explicit confirmation of user input, asking for user to repeat input) are more effective than reducing semantic interpreter confidence levels 504 when noise type parameters 306 and noise level parameters 304 indicate high wind noise may be present. For example, adaptation 320 may determine that reducing confidence levels 504 (e.g., by a predetermined confidence level reduction parameter or amount) is the most effective and least cumbersome for the user when noise type parameters 306 and noise level parameters 304 indicate high engine noise may be present. Modification 224 of dialogue control acts 500 (e.g., implementing clarification acts 502, reducing confidence levels 504, and other modifications) may, for example, be adapted to use the most effective and least cumbersome dialogue control acts 500 given a set of noise type parameters 306 and noise level parameters 304.

According to some embodiments, audio prompts 508 may be introduced and/or modified based on interference profile records 180 (e.g., noise type parameters 306, noise level parameters 304, and other information). Prompts 508 may, for example, include information output from system 100 and may be generated by dialogue control module 210 in response to user input. Prompts 508 may typically be output from system 100 in response to user input, to provide information to user, or for other functions. Prompts 508 may, in some embodiments, inform a user that spoken dialogue system 100 functions and/or performance may be reduced or changed due to high background noise. Prompts 508 may, for example, be generated based on noise type parameters 306 and/or noise level parameters 304. Prompts 508 may, for example, set a user's expectation of spoken dialogue system 100 performance (e.g., that system 100 performance may be reduced), prepare a user for different interaction style (e.g., inform user that system 100 may request user to clarify statements, repeat statements, and perform other functions), or otherwise inform a user that system 100 performance may be altered in the presence of background noise. Noise type parameters 306 and noise level parameters 304 may, for example, indicate high wind noise. Based on the noise type parameters 306 and noise level parameters 304 indicating high wind noise, a prompt 508 may be generated by dialogue control module 210 and output to user (e.g., using speakers 40). Prompt 508 may, for example, set user expectations of system 100 performance with high wind noise. Prompt 508 may, for example, be "please note that voice recognition with windows open at high speed is difficult" or another prompt 508. Based on prompt 508, user may consider closing vehicle window(s) to improve system 100 performance. In some embodiments, prompt 508 may based on noise type parameters 306 and noise level parameters 304 prepare a user for a different spoken dialogue interaction style. Prompt 508 may, for example, be "voice recognition is difficult, I may ask for more clarifications, bear with me, where would you like to go?" or another prompt. Based on prompt 508, user's expectations may be managed and user may, for example, be prepared or pre-warned that system 100 may output more clarification acts 502 (e.g., requests for clarification, repeat, and other clarifications) and/or system 100 functions may be modified (e.g., to compensate for high levels of background noise).

According to some embodiments, the pace and/or timing of prompts 508 may be modified or controlled based on interference profile records 180 (e.g., noise type parameters 306, noise level parameters 304, and other information). The timing of prompt 508 output may, for example, be modified or delayed to output prompt 508 to user at a time when lower background noise (e.g., vehicle related sounds) may be present in vehicle 10. For example, noise type parameters 306 and noise level parameters 304 may indicate high engine noise may be present in vehicle (e.g., noise_type=engine and noise_level=high). Noise type parameters 306 and noise level parameters 304 of high engine noise may, for example, indicate that engine RPM may be high (e.g., driver may be accelerating vehicle 10). Based on noise type parameters 306 and noise level parameters 304 indicating high engine noise, dialogue control 210 may delay prompt 508 output. Dialogue control 210 may, for example, delay a prompt 508 output until noise level parameters 304 indicate engine noise may be reduced. Dialogue control 210 may, in some embodiments, delay a prompt 508 output for a predetermined period of time. The predetermined period of time may, for example, be a typical or average amount of time for vehicle acceleration, may be based on typical driver characteristics (e.g., typical acceleration times), or may be another time period. A typical or average acceleration time may, for example, be determined during vehicle testing, manufacturing, or during a spoken dialogue adaptation process 320.

According to some embodiments, dialogue style 514 may be modified to alter or reduce grammar perplexity 510 or based on interference profile records 180 (e.g., noise type parameters 306, noise level parameters 304, and/or other information). Grammar perplexity 510 may, for example, be the complexity of speech recognition grammar used by speech recognition module or device 204 at a given time. Dialogue control module 210 may, for example, determine grammar perplexity based on interference profile records 180. Grammar perplexity 510 may, for example, be reduced or modified by performing single slot recognition, enforcing exact phrasing, avoiding mixed initiative, and/or using other techniques or approaches. Grammar perplexity 510 may, for example, be reduced or altered based on noise type parameters 306 and noise level parameters 304. For example, noise type parameters 306 and noise level parameters 304 may indicate that high wind noise (e.g., noise_type=wind, noise_level=high) may be present. Based on noise type parameters 306 and noise level parameters 304 indicating high wind noise, dialogue control 210 may reduce grammar perplexity 510 by performing single slot recognition, enforcing exact phrasing, avoiding mixed initiative, and/or performing other actions.

Single slot recognition may, for example, reduce grammar perplexity 510 by reducing or modifying complex prompts requesting multiple slots or types of information into multiple simpler audio prompts requesting a reduced number of or single slots of information. For example, a complex prompt of "what music would you like to hear?" may be modified or reduced to multiple single slot prompts of "please enter song title" followed by "please enter the artist" and/or other prompts. Other prompts related to other topics may of course be used.

In some embodiments, dialogue style 514 may be modified to reduce grammar perplexity 510 by enforcing exact phrasing from a user (e.g., vehicle occupant(s)). Exact phrasing from a user may be enforced by prompting a user to provide exact responses rather than general responses. For example, a prompt 508 of "Which service would like?", which may elicit many different responses from a user may be modified to be prompt 508 of "please say one of a. music, b. directions, c. climate control", which may elicit specific or exact phrasing from a user. If noise type parameters 306 and/or noise level parameters 304 indicate high levels of noise (e.g., wind, engine, HVAC system, audio playback or other noise) may be present in vehicle, dialogue control module 210 may enforce exact phrasing from a user. Other prompts related to other topics may of course be used.

In some embodiments, dialogue style 514 may be modified to reduce grammar perplexity 510 by reducing mixed initiative dialogue style 514. Mixed initiative dialogue style 514 may, for example, allow a user to respond to a question which they were not asked. Mixed initiative may, for example, be disabled or deactivated to reduce grammar perplexity 510 if noise type parameters 306 and/or noise level parameters 304 indicate noise levels above a threshold may be present. For example, dialogue control 210 may output a prompt requesting a type of information (e.g., "what type of hotel are you looking for?"), and mixed initiative may allow a user to provide an off topic response (e.g., "where is the closest restaurant?"). Other prompts 508 related to other topics may be used. Disabling mixed initiative may, for example, require a user to respond to a question asked not allowing user to change conversation topic. If a user provides an off topic response to a question, dialogue control module 210 may request that user response respond to the question asked.

According to some embodiments, modification of dialogue style 514 given interference profile records 180 (e.g., noise type parameters 306, noise level parameters 304, and other parameters or information) may be adapted 320. Modification 224 of dialogue style 514 (e.g., altering grammar perplexity 510 or other dialogue style modifications) may, for example, be adapted by measuring correlations between modification of dialogue style 514 based on interference profile records 180 (e.g., noise type parameters 306 and/or noise level parameters 304) and dialogue control 210 success or functionality. An optimal modification of dialogue style 514 or grammar perplexity 510 reduction approach (e.g., single slot recognition, enforcing exact phrasing, avoiding mixed initiative, or other grammar perplexity reduction approach) for a given interference profile record 180 may be determined. The optimal modification of dialogue style 514 for a given interference profile record 180 may be the modification which is least cumbersome to a user, most improves system 100 functionality, and/or results in dialogue success. An optimal modification of dialogue style 514 may, for example, be determined by measuring dialogue control 210 success with and without modification of dialogue style 514 or grammar perplexity 510. Measured dialogue control success associated with different types of modification of dialogue style 514 or grammar perplexity 510 may be compared to determine a modification of dialogue style 514 or grammar perplexity 510, which most improves dialogue control success. For example, interference profile records 180 (e.g., noise type parameters 306 and noise level parameters 304) may indicate that high HVAC related noise may be present and grammar perplexity 510 may be reduced or modified 224 based on the interference profile records 180. Grammar perplexity 510 may, for example, be reduced by modifying dialogue style 514 to enforce exact phrasing (e.g., prompting a user to choose from a list of options (e.g., "Please say one of a. music, b. directions, or c. gas" instead of "which service would you like?")). Dialogue control 210 success (e.g., success of dialogue control system 210) with enforcement of exact phrasing (e.g., reduced grammar perplexity 510) may be measured. Dialogue control 210 function or success may, for example, be measured based on whether a user completes a dialogue action (e.g., responding to a prompt) correctly, whether user achieves a positive dialogue result (e.g., user finds what they are looking for), or based on other metrics or parameters. Dialogue control 210 success (e.g., success of dialogue control system 210) with enforcement of exact phrasing (e.g., reduced grammar perplexity 510) may be compared to dialogue control 210 success without exact phrasing or dialogue control success 210 with another type of modification of dialogue style 514 or grammar perplexity 510. For example, it may be determined that a type of dialogue style 514 modification to reduce grammar perplexity 510 (e.g., single slot recognition) based on certain interference profile records 180 (e.g., noise type parameters 306 and noise level parameters 304) may result in reduced dialogue control success or be less successful than another type of dialogue style 514 modification and/or no modification to reduce grammar perplexity 510. Based on the determination that a type of dialogue style 514 modification given certain interference profile records 180 may be less successful or unsuccessful in increasing dialogue success, the type of dialogue style 514 modification may, for example, be disabled, adapted, and/or replaced by a different type of dialogue style 514 modification. For example, adaptation 320 may determine that reducing grammar perplexity 510 by enforcing exact phrasing may be more effective than avoiding mixed initiative when noise type parameters 306 and noise level parameters 304 indicate high HVAC noise or other vehicle relate noise may be present. For example, adaptation 320 may determine that reducing grammar perplexity 510 by enforcing exact phrasing may be the most effective and least cumbersome for the user when noise type parameters 306 and noise level parameters 304 indicate high HVAC noise may be present.

According to some embodiments, dialogue control 210 may, based on interference profile records 180 (e.g., noise level parameters 304, noise type parameters 306, and other information), monitor (e.g., listen for) and respond to user confusion 516. If noise type parameters 306 and noise level parameters 304 indicate high noise levels may be present in or around vehicle 10, dialogue control 210 may, for example, be modified to monitor or listen for and respond to user confusion 516. In order to monitor and respond to user confusion 516, dialogue control 210 may, for example, be modified to identify clarification requests input from user. Clarification requests (e.g., spoken by a user) may, for example, include phrases such as "repeat," "I can't hear you," "repeat this prompt," "it's not clear," "what's that?", or other phrases. Clarification requests from a user may, for example, be responded to by dialogue control 210. Dialog control 210 may, for example, respond to clarification requests from a user by repeating the last prompt output, rephrasing the last prompt, or performing other actions. A prompt 508 (e.g., "the closest restaurant is ABC diner" or another prompt) may, for example, be rephrased by changing the order of phrases in prompt 508 (e.g., "ABC is the nearest restaurant"). Other prompts may be used.

According to some embodiments, multi-modal, multi-function, or other type of dialogue may be modified based on interference profile records 180 (e.g., noise type parameters 306, noise level parameters 304, and/or other information). Multi-modal dialogue 512 may, for example, include spoken dialogue combined with tactile, visual, or other dialogue. Multi-modal dialogue 512 may, for example, include spoken dialogue audio prompts requesting user to input information into a tactile device (e.g., input device 44 or another device). Other types of multi-modal dialogue 512 may be used.

In some embodiments, if noise type parameters 306 and noise level parameters 304 indicate high levels of noise may be present in or around vehicle 10, multi-modal dialogue 512 may, for example, be modified by reverting to or favoring visual display over speech prompting, by reverting to or switching to visual display of system hypotheses (e.g., questions, requests for information, and other prompts), prompting or requesting tactile confirmation from a user (e.g., select response from list of responses displayed on touchscreen or other output device), encouraging use of tactile modality (e.g., reduce confidence of the semantic interpreter), switching from speech to other modalities for a subset of application functions (e.g., simple command and control by tactile means), or other modifications.

Based on noise type parameters 306 and noise level parameters 304, dialogue control module 210 may, for example, revert to visual display of system hypotheses by displaying questions, requests for information, and other types of prompts on an output device 42 (e.g., a display screen). Tactile confirmation may, for example, be requested from a user. Dialogue control 210 may, for example, request that user confirm responses to dialogue prompts 508 (e.g., spoken dialogue prompts) or other information output from system 100 using a tactile device, input device 44 (e.g., keyboard, touchscreen, or other input device), and/or other device. System 100 may, for example, output a statement "please confirm that you said hotel by entering yes" using speaker 40, output device 42, or other device, and user may provide tactile confirmation by entering a response (e.g., pressing a button, entering "yes" or other response) into an input device 44 or other device. Dialogue control module 210 may, in some embodiments, request that a user select a response from a list of options. For example, system 100 may prompt user to select an option from a list of options using a tactile device, input device 44 (e.g., keyboard, touchscreen, or other input device), and/or other device. System 100 may, for example, output a prompt "please choose a category: hotels, restaurants, or gas stations on touchscreen" and user may respond to the prompt by entering choosing an option (e.g., hotels, restaurants, or gas stations) on a tactile device, input device 44, and/or other device.

According to some embodiments, modification module 224 may, for example, encourage or increase use of tactile dialogue by altering semantic interpreter confidence levels 504. If, for example, a confidence level 504 is below a threshold confidence level 506, dialogue control module 504 may request tactile confirmation, tactile selection, or other type of input from user. If confidence level 504 associated with a dialogue act is above a threshold confidence level 506, the dialogue act may be deemed to be a correct interpretation of user's input, and system 100 may use speech based dialogue control (e.g., system 100 may not request tactile confirmation, tactile selection, or other type of input from user). Confidence levels 504 may, for example, be reduced based on interference profile records 180 (e.g., noise type parameters 306, noise level parameters 304, or other information). For example, if interference profile records 180 (e.g., noise level parameter 304) indicates vehicle noise related noise above a predefined threshold may be present (e.g., noise_level=medium, noise_level=high, or other noise_level value), confidence levels 504 output from semantic interpreter may be reduced. A confidence level 504 may, for example, be a continuous value (e.g., between 0% and 100% or another range of values) related to or depending on a certainty in speech recognition. Confidence levels 504 may, for example, be altered (e.g., reduced or increased) from a first confidence level value to a second confidence level value (e.g., a confidence level value less than a first confidence level value) based on interference profile records 180. Confidence levels 504 may, for example, be altered (e.g., reduced or increased) according to function (e.g., a continuous function). A confidence level 504 may, for example, be ninety-five percent (e.g., 95%) or any other value if noise level parameter 304 indicates zero or low background noise (e.g., noise level parameter=low). A confidence level 504 may, for example, be reduced from a first value (e.g., ninety-five percent or another value) to, for example, a second value (e.g., eighty percent or another value), which may, for example, be less than a first value if interference profile records 180 indicate moderate to high noise levels may occur in vehicle 10 (e.g., in vehicle passenger compartment). Reducing confidence levels 504 if interference profile records 180 (e.g., noise type parameters 306 and/or noise level parameters 304) indicate high background noise may increase likelihood that dialogue control 210 may request tactile confirmation, selection or other tactile input from user.

According to some embodiments, multi-modal dialogue may be modified 224 by switching from speech to other modalities (e.g., tactile input, visual output, and/or other modalities) for a subset of system 100 functions (e.g., predefined back-end application 212 functions). Based on noise type parameters 306, noise level parameters 304, and/or other information, one or more back-end applications 212 may be switched from speech based modality to non-speech speech modalities (e.g., tactile or other modalities). Other back-end applications 212 may, for example, not be switched to non-speech modalities (e.g., control and/or command may remain speech based). For example, if noise type parameters 306 and noise level parameters 304 indicate high engine noise (e.g., noise_type=engine, noise_level=high), predefined back-end application 212 (e.g., radio, map, voice search, or other back-end application) functionality (e.g., control and command) may be switched from speech based to tactile based control (e.g., using input device 44) while other back-end applications 212 may not be switched from speech to tactile based control. For example, if sound type parameters 306 and/or sound level parameters 304 indicate background noise, voice search and/or other background application(s) 212 may be disabled (e.g., locked out), and speech based radio control and/or other background applications 212 may not be disabled (e.g., may remain active). Which back-end applications 212 are switched to other modalities (e.g., tactile input or other mode of input) or deactivated if sound type parameters 306 and/or sound level parameters 304 indicate background noise may, for example, be determined during vehicle testing, manufacturing, or during adaptation 320.

According to some embodiments, modification of multi-modal dialogue 512 given interference profile records 180 (e.g., noise type parameters 306, noise level parameters 304, and other information) may be adapted 320. Modification 224 of multi-modal dialogue 512 (e.g., reverting to visual display, requesting tactile confirmation, encouraging use of tactile modalities, switching from speech to other modalities for a subset of application functions and/or other modifications) may, for example, be adapted 320 by measuring correlations between noise type parameters 306 and/or noise level parameters 304 and dialogue control 210 success or functionality. Adaptation 320 may, for example, determine the optimal modification of multi-modal dialogue 512 (e.g., reverting to visual display, requesting tactile confirmation, encouraging use of tactile modalities, switching from speech to other modalities for a subset of application functions and/or other modifications) for a given interference profile record 180. The optimal modification of dialogue style 514 for a given interference profile record 180 may be the modification which is least cumbersome to a user and/or best improves system 100 functionality. Adaptation 320 of multi-modal dialogue 512 modification policies or approaches may be similar to adaptation of dialogue style 514 modification policies, adaptation of dialogue control acts 500, and other adaptation 320 processes or approaches.

In some embodiments, all types of modification 224 of dialogue control 210 operations based on noise type profiles 306 and noise level profiles 304 may be adapted 320. Types of modification 224, as discussed herein, may include modification of dialogue control acts 500, introduction of audio prompts 508, modification of prompts 508, modification of dialogue style 514 (e.g., to reduce grammar perplexity 510), monitoring and responding to user confusion 516, modification of multi-modal dialogue 512, modification of back-end application 212 functions, and/or other types of modification 224. The correlation between dialogue success and modification of dialogue control 210 based on noise type parameters 306 and/or noise level parameters 304 may be measured, evaluated, or calculated. The success of a type of dialogue control 210 modification 224 may, for example, be measured or evaluated by determining whether a user provides predictable responses to dialogue control prompts 508 (e.g., whether user responses are on or off topic), whether user provides any response to prompts 508, or using other approaches. Based on the measured dialogue control success, modification of dialogue control 210 processes and operations may be adapted by deactivating, disabling, altering or switching types of dialogue control modification 224, or otherwise altering dialogue control modification 224. Dialogue control modification 224 operations may be altered by, for example, changing the parameters associated with a type modification 210 given noise type parameters 306 and noise level parameters 304. For example, semantic interpreter confidence levels 504 may be altered, parameters related to pace and timing of prompts 508 may be altered, and other parameters may be altered or adapted to improve dialogue control 210 success. Other parameters and operations may be adapted or changed.

Figure 7:
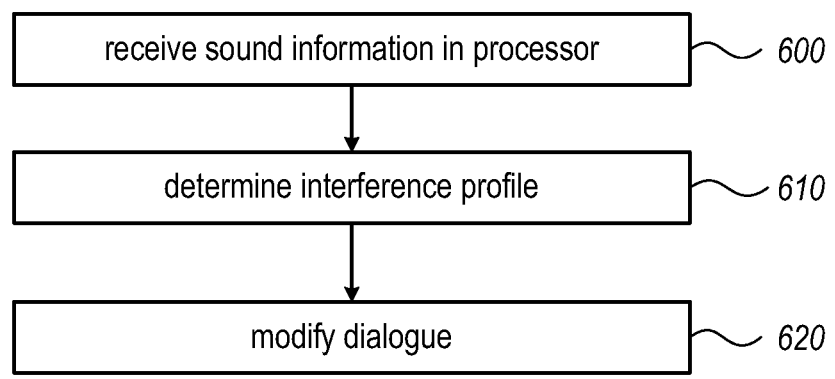
FIG. 7 is a flow chart of a method according to embodiments of the present invention.

FIG. 7 is a flow chart of a method according to embodiments of the present invention. In operation 600, sound related vehicle information (e.g., sound related vehicle information 160 of FIG. 2, or signals or information related to the operation of vehicle systems producing or causing sound) representing or corresponding to one or more sounds may be received in the processor (e.g., interference profiling module 222 of FIG. 3). The sound related vehicle information may in some embodiments not include an audio signal.

Interference profiling module 222 may, for example, be implemented all or in part by processor 110.

In operation 610, interference profile records (e.g., interference profile records 180 of FIG. 2) may be determined based on the sound related vehicle information. The interference profile records may include noise type parameters (e.g., noise type parameters 306 of FIG. 6), noise level parameters (e.g., noise level parameters 304 of FIG. 6)), and/or other parameters. The interference profile records may, for example, be determined using a logical operation or other mathematical operations based on multiple types of sound related vehicle information. The interference profile records may, in some embodiments, be determined by quantizing sound related vehicle information (e.g., vehicle engine RPM information).

In operation 620, spoken dialogue (e.g., in dialogue control 210 of FIG. 3 and/or dialogue control 210 of FIG. 6) of a spoken dialogue system (e.g., system 100 of FIG. 2) associated with the vehicle may be modified based on the sound related vehicle information and/or the interference profile records. Spoken dialogue may, for example, be modified by imposing clarification acts (e.g., clarification acts 502 of FIG. 6), determining and outputting introductory prompts (e.g., prompts 508 of FIG. 6), modifying pace and timing of prompts, modifying dialogue style (e.g., dialogue style 514 of FIG. 6) to reduce grammar perplexity (e.g., grammar perplexity 510 of FIG. 6), monitoring and responding to user confusion (e.g., user confusion 516 of FIG. 6), modifying multi-modal dialogue (e.g., multi-modal dialogue 512 of FIG. 6), and/or using other spoken dialogue modification approaches.

Other or different series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
receiving, in a processor associated with a vehicle, sound related vehicle information representing one or more sounds, the sound related vehicle information measured an exterior microphone located exterior to a cabin of the vehicle;
and modifying spoken dialogue of a spoken dialogue system associated with the vehicle based on the sound related vehicle information;
comprising determining interference profile records based on the sound related vehicle information;
wherein modifying spoken dialogue of the spoken dialogue system associated with the vehicle based on the sound related vehicle information comprises:
modifying pace and timing and pitch of audio prompts based on the interference profile records;
and outputting the modified audio prompts.

2. The method of claim 1, wherein modifying spoken dialogue of the spoken dialogue system associated with the vehicle based on the sound related vehicle information comprises:
determining introductory audio prompts based on the interference profile records; and
outputting the introductory audio prompts to a user.

3. The method of claim 1, wherein modifying spoken dialogue of the spoken dialogue system associated with the vehicle based on the sound related vehicle information comprises:
modifying dialogue style to reduce grammar perplexity based on the interference profile records.

4. The method of claim 1, wherein modifying spoken dialogue of the spoken dialogue system associated with the vehicle based on the sound related vehicle information comprises:
monitoring user confusion; and
outputting audio prompts responding to the user confusion.

5. The method of claim 1, wherein modifying spoken dialogue of the spoken dialogue system associated with the vehicle based on the sound related vehicle information comprises:
modifying multi-modal dialogue based on the interference profile records.

6. The method of claim 1, comprising:
measuring a success of modifying the spoken dialogue based on the sound related vehicle information in increasing dialogue success; and
adapting modification of the spoken dialogue based on the measured success.

7. The method of claim 1, wherein the external microphone is located in an exterior location selected from a group consisting of:
a vehicle body;
a vehicle bumper;
a vehicle trunk; and
a vehicle windshield.

8. A system for a vehicle, the system comprising:
a memory;
an exterior microphone located exterior to a cabin of the vehicle for measuring sound-related information, a processor associated with the vehicle to:
receive, in the processor associated with the vehicle, sound related vehicle information representing one or more sounds measured by the exterior microphone; and modify spoken dialogue of a spoken dialogue system associated with the vehicle based on the sound related vehicle information;
wherein the processor is to determine interference profile records based on the sound related vehicle information;
wherein to modify spoken dialogue of the spoken dialogue system associated with the vehicle based on the sound related vehicle information the processor is to:
modify pace and timing and pitch of audio prompts based on the interference profile records;
and output the modified audio prompts.

9. The system of claim 8, wherein to modify spoken dialogue of the spoken dialogue system associated with the vehicle based on the sound related vehicle information the processor is to:
determine introductory audio prompts based on the interference profile records; and
output the introductory audio prompts to a user.

10. The system of claim 8, wherein to modify spoken dialogue of the spoken dialogue system associated with the vehicle based on the sound related vehicle information the processor is to:
modify dialogue style to reduce grammar perplexity based on the interference profile records; and
output modified prompts.

11. The system of claim 8, wherein to modify spoken dialogue of the spoken dialogue system associated with the vehicle based on the sound related vehicle information the processor is to:
monitor user confusion; and
output audio prompts responding to the user confusion.

12. The system of claim 8, wherein to modify spoken dialogue of the spoken dialogue system associated with the vehicle based on the sound related vehicle information the processor is to:
modify multi-modal dialogue based on the interference profile records.

13. The system of claim 8, wherein the processor is to:
measure a success of the spoken dialogue modification based on the sound related vehicle information in increasing dialogue success; and
adapt the spoken dialogue modification based on the measured success.

14. The system of claim 8, wherein the external microphone is located in an exterior location selected from a group consisting of:
a vehicle body;
a vehicle bumper;
a vehicle trunk; and
a vehicle windshield.

15. A method comprising:
receiving, at a controller associated with a spoken dialogue system, information related to the operation of vehicle systems causing sound and measured by an exterior microphone located exterior to a vehicle cabin;
calculating interference profile records based on the information, the interference profile records representing noise types and noise levels; and
altering dialogue control based on the interference profile records;
wherein altering dialogue control based on the interference profile records comprises:
delaying and modifying pitch, pace and timing of an audio prompt output from the spoken dialogue system based on the interference profile records.

16. The method of claim 15, wherein altering dialogue control based on the interference profile records comprises reducing confidence levels associated with a semantic interpreter.

17. The method of claim 15, wherein altering dialogue control based on the interference profile records comprises modifying a backend application associated the spoken dialogue system based on the interference profile records.

18. The method of claim 15, wherein the external microphone is located in an exterior location selected from a group consisting of:
a vehicle body;
a vehicle bumper;
a vehicle trunk; and
a vehicle windshield.

* * * * *